US011172173B2

(12) United States Patent
Zhang et al.

(10) Patent No.: US 11,172,173 B2
(45) Date of Patent: Nov. 9, 2021

(54) IMAGE PROCESSING DEVICE, IMAGE PROCESSING METHOD, PROGRAM, AND IMAGING DEVICE

(71) Applicant: Sony Group Corporation, Tokyo (JP)

(72) Inventors: Ting Zhang, Tokyo (JP); Yohei Myoga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/742,135

(22) Filed: Jan. 14, 2020

(65) Prior Publication Data

US 2020/0154083 A1 May 14, 2020

Related U.S. Application Data

(63) Continuation of application No. PCT/JP2018/020716, filed on May 30, 2018.

(30) Foreign Application Priority Data

Jul. 21, 2017 (JP) .............................. JP2017-141731

(51) Int. Cl.
*H04N 9/04* (2006.01)
*H04N 9/67* (2006.01)
*H04N 9/73* (2006.01)

(52) U.S. Cl.
CPC ..... *H04N 9/04517* (2018.08); *H04N 9/04515* (2018.08); *H04N 9/67* (2013.01); *H04N 9/73* (2013.01)

(58) Field of Classification Search
None
See application file for complete search history.

(56) References Cited

U.S. PATENT DOCUMENTS

2013/0050540 A1* 2/2013 Kano ...................... G06T 5/006
348/241
2015/0373314 A1* 12/2015 Zhu ........................... H04N 9/77
348/648

FOREIGN PATENT DOCUMENTS

CN 101552873 A 10/2009
CN 101867826 A 10/2010
(Continued)

OTHER PUBLICATIONS

Chinese Office Action dated Jun. 3, 2021 for corresponding Chinese Application No. 201880046933.0.

*Primary Examiner* — Quan Pham
(74) *Attorney, Agent, or Firm* — Michael Best & Friedrich LLP

(57) ABSTRACT

A signal processing unit performs preprocessing, demosaic processing and color reproduction processing on an image signal. A control unit detects an image area having undergone a characteristic change exceeding a predetermined change amount, by using an image signal before the reproduction processing and an image signal after the color reproduction processing. The control unit associates area information indicating the detection result of the image area having undergone a characteristic change exceeding a predetermined change amount with the image signal after the color reproduction processing, and records the area information on a recording medium, or outputs the area information to an external device. Thus, it becomes possible to detect an image area where a control change caused by color reproduction processing is unnatural.

25 Claims, 13 Drawing Sheets

(56) References Cited

FOREIGN PATENT DOCUMENTS

| | | |
|---|---|---|
| CN | 102651136 A | 8/2012 |
| CN | 102917183 A | 2/2013 |
| CN | 103167292 A | 6/2013 |
| JP | 2005-229198 A | 8/2005 |
| JP | 2010-206725 A | 9/2010 |
| JP | 2012-119780 A | 6/2012 |
| JP | 2017-126952 A | 7/2017 |

* cited by examiner

FIG. 9
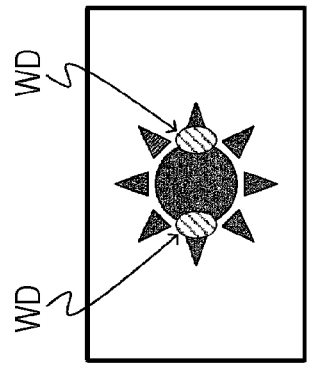
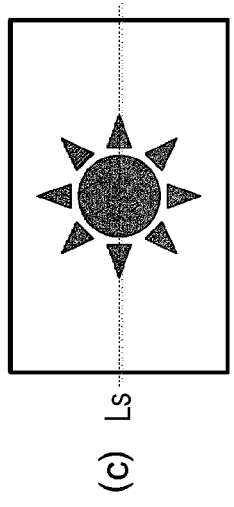
(c) Ls
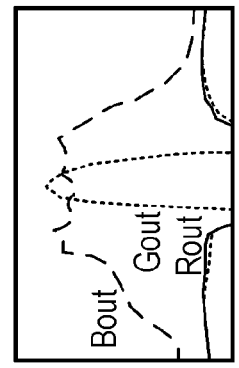
(d) Bout Gout Rout
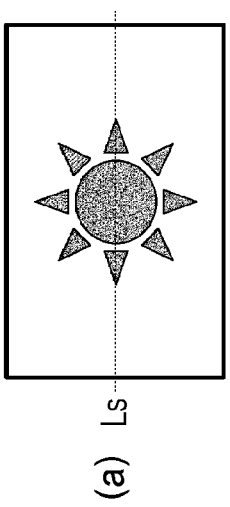
(a) Ls
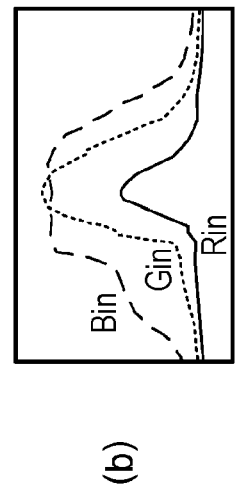
(b) Bin Gin Rin
(e) WD WD

IMAGE PROCESSING DEVICE, IMAGE PROCESSING METHOD, PROGRAM, AND IMAGING DEVICE

CROSS REFERENCE TO RELATED APPLICATIONS

This application is a Continuation of International Application Number PCT/JP2018/020716, filed on May 30, 2018, which contains subject matter related to Japanese Priority Patent Application JP 2017-141731, filed Jul. 21, 2017, the entire contents of which are incorporated herein by reference.

TECHNICAL FIELD

This technique relates to an image processing device, an image processing method, a program, and an imaging device, and enables detection of an image area having an unnatural image characteristic generated by color reproduction processing.

BACKGROUND ART

Conventionally, in an imaging device, a technique for avoiding clipped whites and clipped blacks in a screen has been proposed. For example, an imaging device of Patent Document 1 detects an LED light source from a through image, and when an LED light source is detected, sets divided areas, so that the number of divided areas for detecting brightness increases. Additionally, the imaging device adjusts the size of each set divided area to match an LED light source having high directivity, so that the divided photometric value is not affected by other light sources. Furthermore, the imaging device performs dynamic range expansion processing on the basis of the divided photometric values, and gives an appropriate gradation to a part irradiated by an LED light source or a highlighted part when an LED light source exists.

CITATION LIST

Patent Document

Patent Document 1: Japanese Patent Application Laid-open No. 2012-119780

SUMMARY OF THE INVENTION

Problems to be Solved by the Invention

Incidentally, in an imaging device, color reproduction processing is performed not only to avoid clipped whites and clipped blacks, but also to present a captured image with natural colors and desired color characteristics. In color reproduction processing, when illumination light having a wavelength characteristic different from an assumed illumination light is used, a part having an image characteristic such as an unnatural color or gradation may be generated. For example, in a case where color reproduction processing corresponding to illumination light having a wider bandwidth than that of an LED light source is performed, and an LED light source or the like having a narrow bandwidth is used in addition to the assumed illumination light, if color reproduction processing is performed on an image signal of a captured image, a part having an image characteristic such as an unnatural color or gradation may be generated due to the influence of illumination light having a narrow bandwidth.

Against this background, an objective of the present technology is to provide an image processing device, an image processing method, a program, and an imaging device that can detect an image area having an unnatural image characteristic generated by color reproduction processing.

Solutions to Problems

A first aspect of the technology is
an image processing device including
a color reproduction processing unit that performs color reproduction processing on an image signal, and
an area detection unit that detects an image area having undergone a characteristic change exceeding a predetermined change amount, by using an image signal before the color reproduction processing and an image signal after the color reproduction processing.

In this technique, a color reproduction processing unit performs color reproduction processing which is at least one of white balance adjustment, color gradation conversion processing, or color space conversion processing on an image signal, and an area detection unit detects an image area having undergone a characteristic change exceeding a predetermined change amount, by using an image signal before the color reproduction processing and an image signal after the color reproduction processing. For example, the area detection unit uses a pixel signal before color reproduction processing and a pixel signal after color reproduction processing of a pixel in a predetermined area based on a determination target pixel to calculate dispersions thereof, and determines a pixel whose dispersion change amount before and after color reproduction processing exceeds a threshold as a pixel of the image area having undergone a characteristic change exceeding a predetermined change amount. Note that the threshold may be adjusted according to at least one of image attributes such as the color and texture level of the subject or the brightness of the image. Additionally, the area detection unit may determine, as a pixel of the image area having undergone a characteristic change exceeding a predetermined change amount, a pixel in which a pixel signal before color reproduction processing is unsaturated and a pixel signal after color reproduction processing is saturated. The area detection unit may also determine, as a pixel of the image area having undergone a characteristic change exceeding a predetermined change amount, a pixel whose dispersion change amount exceeds a threshold and in which a pixel signal before color reproduction processing is unsaturated and a pixel signal after color reproduction processing is saturated.

Additionally, a warning unit is provided to notify the user that color reproduction processing exceeding the predetermined amount of change detected by the area detection unit is performed. The warning unit is capable of identifying an image area having undergone a characteristic change exceeding a predetermined change amount, in the display image based on the image signal after color reproduction processing. Additionally, a sensor unit that generates spectral information is provided, and the area detection unit detects whether an image area having undergone a characteristic change exceeding a predetermined change amount could occur, according to a comparison result between a light source analysis result based on the image signal and a light source analysis result based on spectral information generated by the sensor unit.

Furthermore, a blend processing unit is provided to blend the image signal subjected to color reproduction processing by the color reproduction processing unit and the image signal not subjected to color reproduction processing at a blend ratio set by the area detection unit. The area detection unit sets the blend ratio according to the detection result of the characteristic change exceeding the predetermined change amount. For example, the area detection unit reduces the ratio of the image signal after color reproduction processing is performed by the color reproduction processing unit with increase in the change amount of characteristic change or increase in an area of the image area having undergone a characteristic change exceeding a predetermined change amount.

A second aspect of the technology is an image processing method including performing color reproduction processing on an image signal, and detecting an image area having undergone a characteristic change exceeding a predetermined change amount, by using an image signal before the color reproduction processing and an image signal after the color reproduction processing.

A third aspect of the technology is a program for causing a computer to execute image signal processing, the program causing the computer to execute a procedure of performing color reproduction processing on the image signal, and a procedure of detecting an image area having undergone a characteristic change exceeding a predetermined change amount, by using an image signal before the color reproduction processing and an image signal after the color reproduction processing.

Note that the program of the present technology is a program that can be provided by a storage medium provided in a computer-readable format to a general-purpose computer that can execute various program codes, a communication medium, a storage medium such as an optical disk, a magnetic disk, or a semiconductor memory, or a program that can be provided by a communication medium such as a network. By providing such a program in a computer-readable format, processing corresponding to the program is realized on the computer.

A fourth aspect of the technology is an imaging device including a color reproduction processing unit that performs color reproduction processing on an image signal generated by an imaging unit, and a control unit that detects an image area having undergone a characteristic change exceeding a predetermined change amount by using an image signal before the color reproduction processing and an image signal after the color reproduction processing, generates detection information indicating a detection result, and associates the detection information with the image signal after the color reproduction processing.

In this technique, color reproduction processing is performed on the image signal generated by the imaging unit in the color reproduction processing unit, and an image is displayed on the display unit on the basis of the image signal after color reproduction processing. Additionally, the image signal after color reproduction processing is recorded on a recording medium or output to an external device. The control unit uses an image signal before color reproduction processing and an image signal after color reproduction processing to detect an image area subjected to color reproduction processing in which a characteristic change exceeds a predetermined change amount, and generates detection information indicating the detection result. Additionally, the control unit performs display control that makes it possible to identify an image area subjected to color reproduction processing in which a characteristic change exceeds a predetermined change amount, in an image displayed on the display unit. Further, the control unit associates the generated detection information with the image signal after color reproduction processing, and records the detection information on a recording medium or outputs the detection information to an external device.

Effects of the Invention

According to this technique, color reproduction processing is performed on an image signal. Additionally, an image area having undergone a characteristic change exceeding a predetermined change amount is detected, by using an image signal before color reproduction processing and an image signal after the color reproduction processing. Hence, it becomes possible to detect an image area having an unnatural image characteristic generated by color reproduction processing. Note that the effect described in the present specification is merely an illustration and is not restrictive. Hence, additional effects can be obtained.

BRIEF DESCRIPTION OF DRAWINGS

FIG. 9 is a diagram showing an operation example of the imaging device.

MODE FOR CARRYING OUT THE INVENTION

Hereinafter, modes for carrying out the present technology will be described. Note that the description will be given in the following order.

1. Configuration of image processing device
2. Configuration of imaging device
3. Unnatural area detection operation
   3-1. First detection operation
      3-1-1. First determination processing example of unnatural area
      3-1-2. Second determination processing example of unnatural area
      3-1-3. Third determination processing example of unnatural area
      3-1-4. Fourth determination processing example of unnatural area
      3-1-5. Fifth determination processing example of unnatural area
   3-2. Second detection operation
   3-3. Third detection operation
   3-4. Fourth detection operation
4. Unnatural area correction operation
5. Application example <1. Configuration of Image Processing Device>

Figure 1:
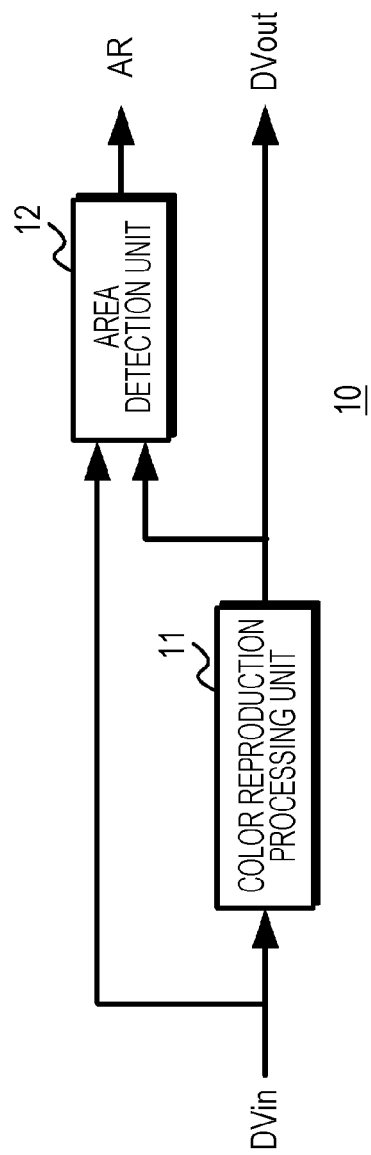
FIG. 1 is a diagram illustrating a configuration of an image processing device.

FIG. 1 illustrates a configuration of an image processing device of the present technology. An image processing device 10 has a color reproduction processing unit 11 and an area detection unit 12. The color reproduction processing unit 11 performs color reproduction processing on an image signal DVin to generate an image signal DVout of an image having natural colors or image characteristics desired by the user. The area detection unit 12 uses image signals before and after color reproduction processing is performed by the color reproduction processing unit 11, to detect an image area in which a characteristic change exceeds a predetermined change amount, and generates detection information AR indicating the detection result. Note that details of the color reproduction processing unit 11 and the area detection unit 12 will be described in the configuration and operation of an imaging device to which the image processing device is applied.

<2. Configuration of Imaging Device>

Figure 2:
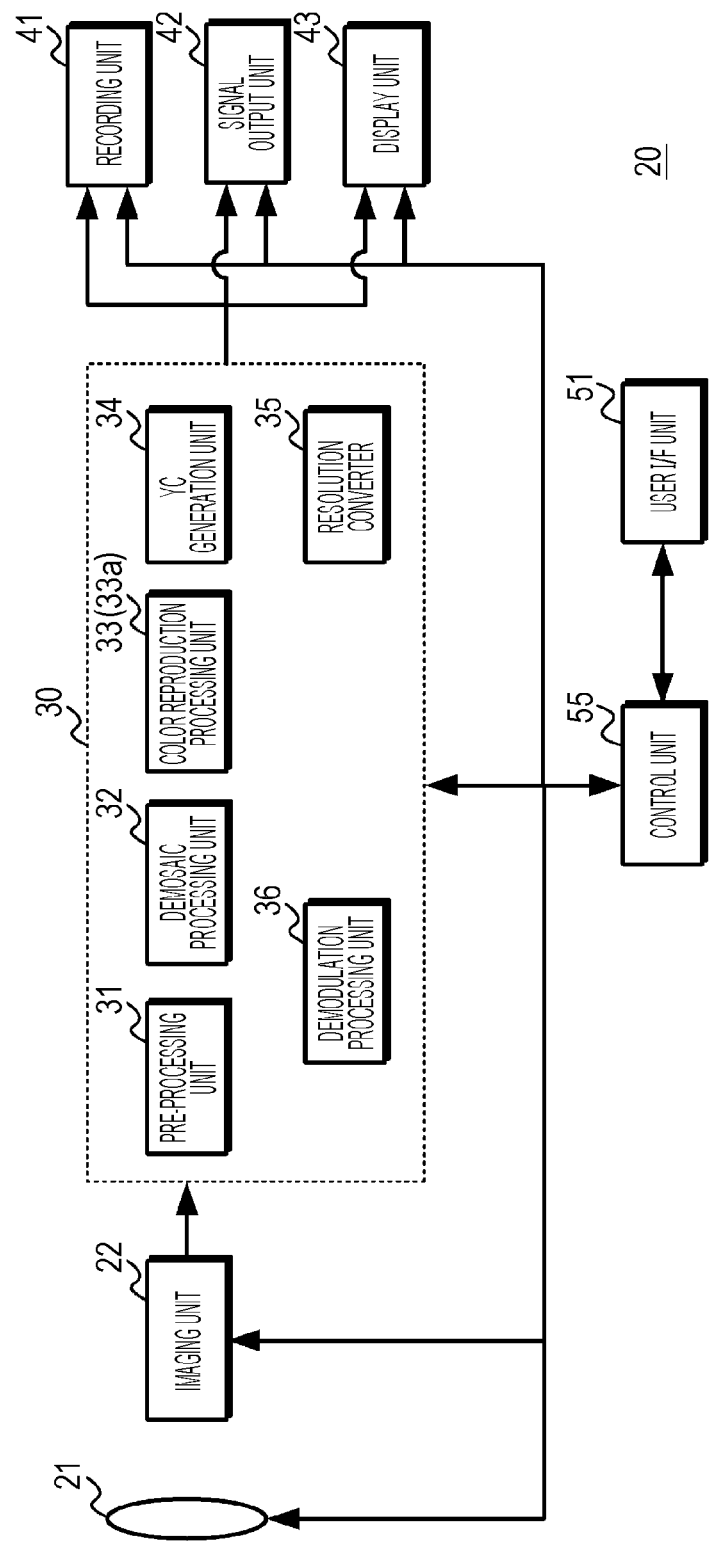
FIG. 2 is a diagram illustrating a configuration in a case where an image processing device is applied to an imaging device.

FIG. 2 illustrates a configuration in a case where the image processing device of the present technology is applied to an imaging device. An imaging device 20 has an imaging optical system 21, an imaging unit 22, a signal processing unit 30, a recording unit 41, a signal output unit 42, a display unit 43, a user interface (I/F) unit 51, and a control unit 55. Note that the signal processing unit 30 has a color reproduction processing unit, and the control unit 55 also operates as an area detection unit.

The imaging optical system 21 includes a focus lens, a zoom lens, and the like. The imaging optical system 21 drives a focus lens, a zoom lens, and the like on the basis of a control signal from the control unit 55 to form a subject optical image on an imaging surface of the imaging unit 22. Additionally, the imaging optical system 21 may be provided with an iris (aperture) mechanism, a shutter mechanism, and the like. Note that the imaging optical system 21 may be detachable from or fixedly attached to a main body portion of the imaging device 20.

An image sensor such as a complementary metal oxide semiconductor (CMOS), a charge coupled device (CCD), or the like is used as the imaging unit 22. The imaging unit 22 performs photoelectric conversion to generate an image signal corresponding to the subject optical image, and outputs the image signal to the signal processing unit 30.

The signal processing unit 30 includes a pre-processing unit 31, a demosaic processing unit 32, a color reproduction processing unit 33, a YC generation unit 34, and a resolution converter 35. Note that the signal processing unit 30 is not limited to the configuration shown in FIG. 2, and may omit some functional blocks as will be described later, or may have functional blocks not shown in FIG. 2.

The pre-processing unit 31 of the signal processing unit 30 performs noise removal processing, gain adjustment processing, analog/digital conversion processing, defective pixel correction, and the like on the image signal generated by the imaging unit 22.

The demosaic processing unit 32 is provided in a case where a mosaic color filter is used in the imaging unit 22 and the pixels on the imaging surface are any of the color components (e.g., red component, blue component, and green component), for example. The demosaic processing unit 32 performs demosaic processing using the image signal processed by the pre-processing unit 31 to generate an image signal in which one pixel indicates each of the color components, such as an image signal of three primal colors, from an image signal in which one pixel indicates one color component, and outputs the image signal to the color reproduction processing unit 33. Note that the image signal generated by the demosaic processing is not limited to the three primary colors, and an image signal of a four-color image may be generated. Additionally, the pixel arrangement of the imaging unit 22 may be a Bayer arrangement, a stripe arrangement, or the like, as long as synchronization can be achieved. Additionally, the pixel arrangement of the imaging unit 22 is not limited to the three primary color pixels, and may be complementary color pixels. Further, in a case where an image signal of the three primary colors is generated by the imaging unit 22, it is not necessary to provide the demosaic processing unit 32, and the image signal processed by the pre-processing unit 31 is output to the color reproduction processing unit 33.

Figure 3:
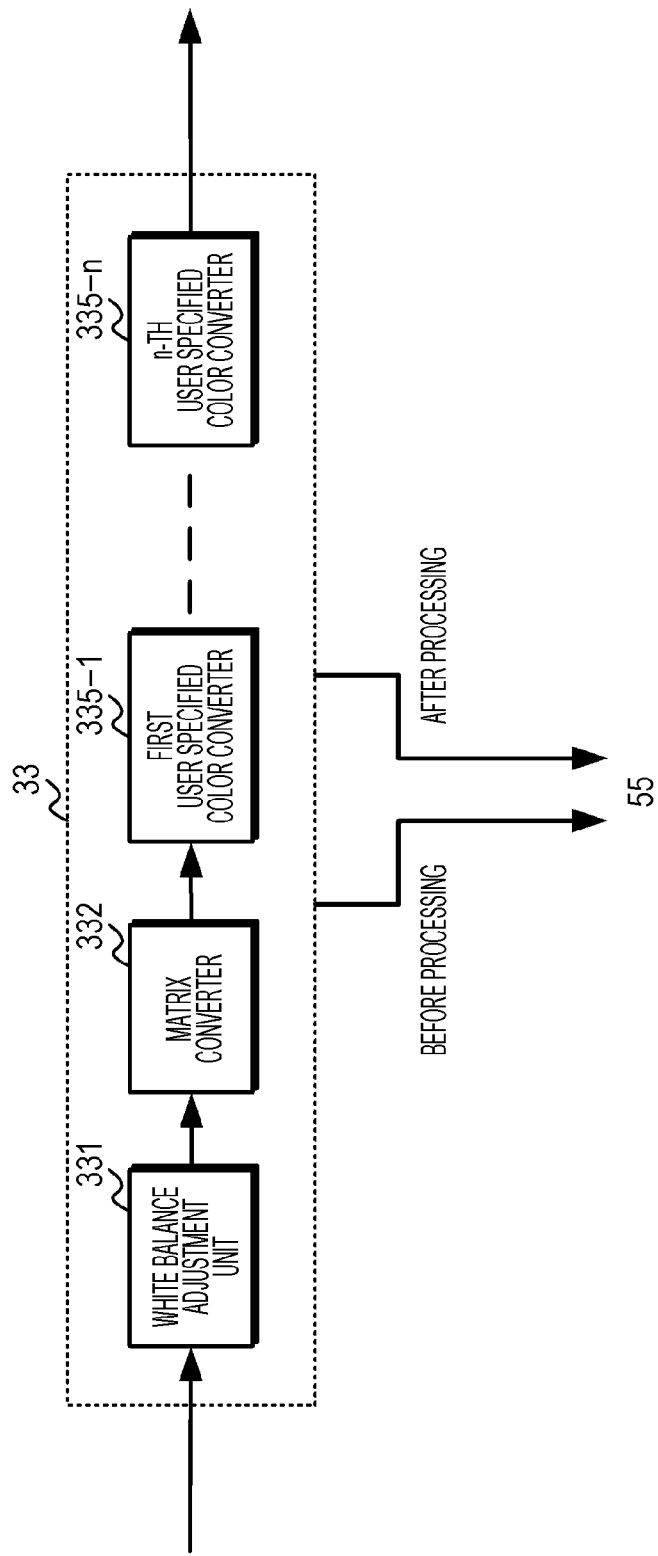
FIG. 3 is a diagram illustrating a configuration of a color reproduction processing unit.

Next, a configuration of the color reproduction processing unit 33 will be described. FIG. 3 illustrates a configuration of the color reproduction processing unit. The color reproduction processing unit 33 has a white balance adjustment unit 331, a matrix converter 332, and a first user specified color converter 335-1 to an n-th user specified converter 335-n.

The white balance adjustment unit 331 corrects an imbalance among colors caused by a difference in the color temperature environment of the subject, a difference in sensitivity of the color filter used in the imaging unit 22, and the like. For example, the white balance adjustment unit 331 performs an appropriate gain adjustment for each color on the three primary color image signals, so that the color balance of an achromatic portion of the subject can be reproduced as an achromatic color. The white balance adjustment unit 331 outputs the image signal after white balance adjustment to the matrix converter 332. Equations (1) to (3) exemplify processing performed by the white balance adjustment unit 331.

$$Rout = WBr \times Rin \quad (1)$$

$$Gout = WBg \times Gin \quad (2)$$

$$Bout = WBb \times Bin \quad (3)$$

Note that "Rin, Gin, Bin" indicate the three primary color signals before white balance adjustment, "Rout, Gout, Bout" indicate the three primary color signals after white balance adjustment, and "WBr, WBg, WBb" indicate the white balance gain for the color signals. The white balance gain is set according to a light source analysis result of illumination light. Additionally, instead of setting the white balance gains "WBr, WBg, WBb" individually, the gain of the red signal and the blue signal may be adjusted with reference to a color signal of a highly sensitive color component, such as a green signal. That is, "WBr, WBb" may be set by fixing WBg to "1". Note that the light source analysis of the illumination light may be performed by a demodulation processing unit 36 described later, or may be performed by the white balance adjustment unit 331.

The matrix converter 332 performs a matrix operation on each color signal using matrix coefficients in order to improve color reproducibility. Note that matrix conversion is also referred to as linear matrix conversion. The matrix coefficients are provided in the form of a table in advance, and the matrix converter 332 performs matrix operation using matrix coefficients of a table corresponding to the light source or the like of illumination light, for example. The matrix converter 332 outputs the image signal after matrix conversion to the first user specified converter 335-1. Equation (4) represents a matrix expression.

[Expression 1]

$$\begin{bmatrix} R_{out} \\ G_{out} \\ B_{out} \end{bmatrix} = \begin{bmatrix} X_{00} X_{01} X_{02} \\ Y_{00} Y_{01} Y_{02} \\ Z_{00} Z_{01} Z_{02} \end{bmatrix} \times \begin{bmatrix} R_{in} \\ G_{in} \\ B_{in} \end{bmatrix} \qquad (4)$$

Note that "Rin, Gin, Bin" indicate the three primary color signals before matrix conversion, "Rout, Gout, Bout" indicate the three primary color signals after matrix conversion, and "X00, X01, X02, Y00, Y01, Y02, Z00, Z01, Z02" "Indicate matrix operation coefficients.

The first to n-th user specified color converters 335-1 to 335-$n$ perform color conversion specified by an operation signal from the user interface unit 51. For example, color conversion is gamma adjustment, color grading using a look up table (LUT) or a color decision list (CDL) generated and stored in advance for the user to perform desired color conversion, color space conversion, or the like.

A LUT is a table generated and stored in advance for the user to perform desired color conversion. Additionally, a CDL is a list in which parameters such as slope, offset, and power are provided for each color signal so that the user can perform desired color conversion. In color space conversion, in a case where white balance adjustment and matrix conversion are performed in the RGB color space and an image signal output from the signal processing unit 30 is to be output as an image signal of another color space such as the YUV color space or the HSV color space, for example, color space conversion from the RGB color space to the color space of the image signal to be output is performed.

Referring back to FIG. 2, the YC generation unit 34 generates a luminance signal and a color difference signal from the image signal processed by the color reproduction processing unit 33. Note that the processing of the YC generation unit 34 may be performed by the user specified color converter in the color reproduction processing unit 33.

The resolution converter 35 converts the image signal after color reproduction processing output from the color reproduction processing unit 33 into an image signal having a desired image size. The resolution converter 35 converts an image signal after color reproduction processing or a luminance signal and color difference signal generated by the YC generation unit 34 into a recording resolution signal or a display resolution signal of the display unit 43, for example. Additionally, the resolution converter 35 converts a recording resolution signal into a signal corresponding to a display resolution of the display unit 43, for example.

The demodulation processing unit 36 performs demodulation processing for acquiring demodulation values used for auto focus (AF) processing, auto exposure (AE) processing, auto white balance (AWB) processing, and the like. For example, the demodulation processing unit 36 uses a specific area or a desired subject area on the screen as a demodulation area to detect the contrast of the demodulation area and generate an AF demodulation value, to detect the luminance of the demodulation area and generate an AE demodulation value, or to generate other values. The demodulation processing unit 36 outputs the demodulation value acquired by the demodulation processing to the control unit 55. Additionally, the demodulation processing unit 36 detects a light source of illumination light on the basis of an image signal when a white subject is imaged, and outputs the light source detection result to the white balance adjustment unit 331, the matrix converter 332, or the control unit 55.

The recording unit 41 is provided with a fixed or detachable recording medium. The recording unit 41 records, to the recording medium, an image signal processed by the color reproduction processing unit 33 or a luminance signal and color difference signal generated by the YC generation unit 34, and an image signal or a luminance signal and color difference signal converted into a recording resolution by the resolution converter 35. Additionally, the recording unit 41 outputs a signal recorded on the recording medium to the resolution converter 35 or the display unit 43. Additionally, the recording unit 41 may record, on the recording medium, an encoded signal obtained by performing encoding processing of the luminance signal and color difference signal of the recording resolution, and may output, to the display unit 43 or the like, a signal obtained by performing decoding processing of an encoded signal recorded on the recording medium. Additionally, the recording unit 41 records, on the recording medium, detection information supplied from the control unit 55 in association with the signal to be recorded. For example, the recording unit 41 records detection information supplied from the control unit 55 as meta information of the signal to be recorded.

The signal output unit 42 outputs the image signal processed by the color reproduction processing unit 33 or the luminance signal and color difference signal generated by the YC generation unit 34 to an external device. Additionally, the signal output unit 42 may perform encoding processing of the luminance signal and color difference signal, and output the obtained encoded signal to an external device. Further, the signal output unit 42 outputs, to the external device, the detection information supplied from the control unit 55 in association with the signal output to the external device. For example, when outputting the image signal processed by the color reproduction processing unit 33 to an external device or the like, the signal output unit 42 outputs the detection information supplied from the control unit 55 as meta information of the image signal.

A liquid crystal display element, an organic EL display element, or the like is used as the display unit 43. The display unit 43 displays an image on the basis of the image signal after color reproduction processing converted into the display resolution by the resolution converter 35. The display unit 43 also displays a menu, operation settings, operation states, and the like of the imaging device 20. Further, the display unit 43 can identify an image area in which a characteristic change exceeds a predetermined change amount in the displayed image based on the image signal after color reproduction processing.

The user interface (I/F) unit 51 includes an operation switch or an operation button, an operation dial, a remote control signal receiving portion, and the like, and generates and outputs an operation signal corresponding to a user operation to the control unit 55.

The control unit 55 has a central processing unit (CPU), a read only memory (ROM), a random access memory (RAM), and other parts, for example. The read only memory (ROM) stores various programs executed by a central processing unit (CPU). The random access memory (RAM) stores information such as various parameters. The CPU executes various programs stored in the ROM, and controls each unit so that an operation corresponding to a user operation is performed in the imaging device 20 on the basis of an operation signal from the user interface unit 51. Additionally, the control unit 55 performs an auto focus (AF) control function, an auto exposure (AE) or auto white balance (AWB) control function, and the like, on the basis of the demodulation value acquired by the demodulation processing unit 36 of the signal processing unit 30.

Furthermore, the control unit 55 has a function of an area detection unit that detects an image area having undergone a characteristic change exceeding a predetermined change amount. The control unit 55 uses image signals before and after color reproduction processing is performed by the color reproduction processing unit 33, to detect an image area having an image characteristic such as an unnatural color or grayscale due to color reproduction processing. Then, the control unit 55 generates detection information indicating the detection result. Additionally, the control unit 55 outputs the generated detection information to the signal processing unit 30, superimposes a warning display signal based on the detection information on the image signal after color reproduction processing, and displays, on the display unit 43 in real time, a warning image indicating an image area having undergone a characteristic change exceeding a predetermined change amount on the displayed image based on the image signal after color reproduction processing. Further, the control unit 55 outputs the detection information to the recording unit 41, and records the detection information on the recording medium in association with the image signal after the image processing. Additionally, the control unit 55 outputs the detection information to the signal output unit 42, and outputs the detection information to the external device in association with the image signal after the image processing. Note that detection information includes information (coordinates and area) indicating an area that has come to have an unnatural image characteristic due to color reproduction processing, and a frame number. Additionally, detection information may include demodulation information (dispersion, change amount of dispersion, and the like).

In this way, if detection information is recorded or output in association with an image signal, a device that performs post processing of the recorded or output image signal can use the detection information associated with the image signal to perform image correction processing efficiently on an image area that comes to have an unnatural image characteristic due to color reproduction processing.

<3. Unnatural Area Detection Operation>

Next, an operation of detecting an image area having an unnatural image characteristic (also referred to as unnatural area) generated by color reproduction processing will be described. The control unit 55 acquires an unprocessed image signal and processed image signal from the color reproduction processing unit 33, and detects an image area having undergone a characteristic change exceeding a predetermined change amount due to color reproduction processing, on the basis of the acquired image signal. Further, the control unit 55 generates detection information indicating the detected image area.

<3-1. First Detection Operation>

In a first detection operation, a case will be described in which matrix conversion is performed as color reproduction processing, and an image area having undergone a characteristic change exceeding a predetermined change amount is detected by the matrix conversion. In this case, the control unit 55 acquires an image signal before matrix conversion from the color reproduction processing unit 33, and retains the image signal. Additionally, the control unit 55 acquires an image signal after matrix conversion from the color reproduction processing unit 33, and from the image signals before and after matrix conversion of the same frame, detects an image area that has come to have an unnatural image characteristic by the matrix conversion, such as an image area in which grayscale is largely degraded by the matrix conversion.

Next, an unnatural area determination processing example in the first detection operation will be described with reference to a flowchart. Note that the flowchart shows a processing example for an image of one frame.

<3-1-1. First Determination Processing Example of Unnatural Area>

Figure 4:
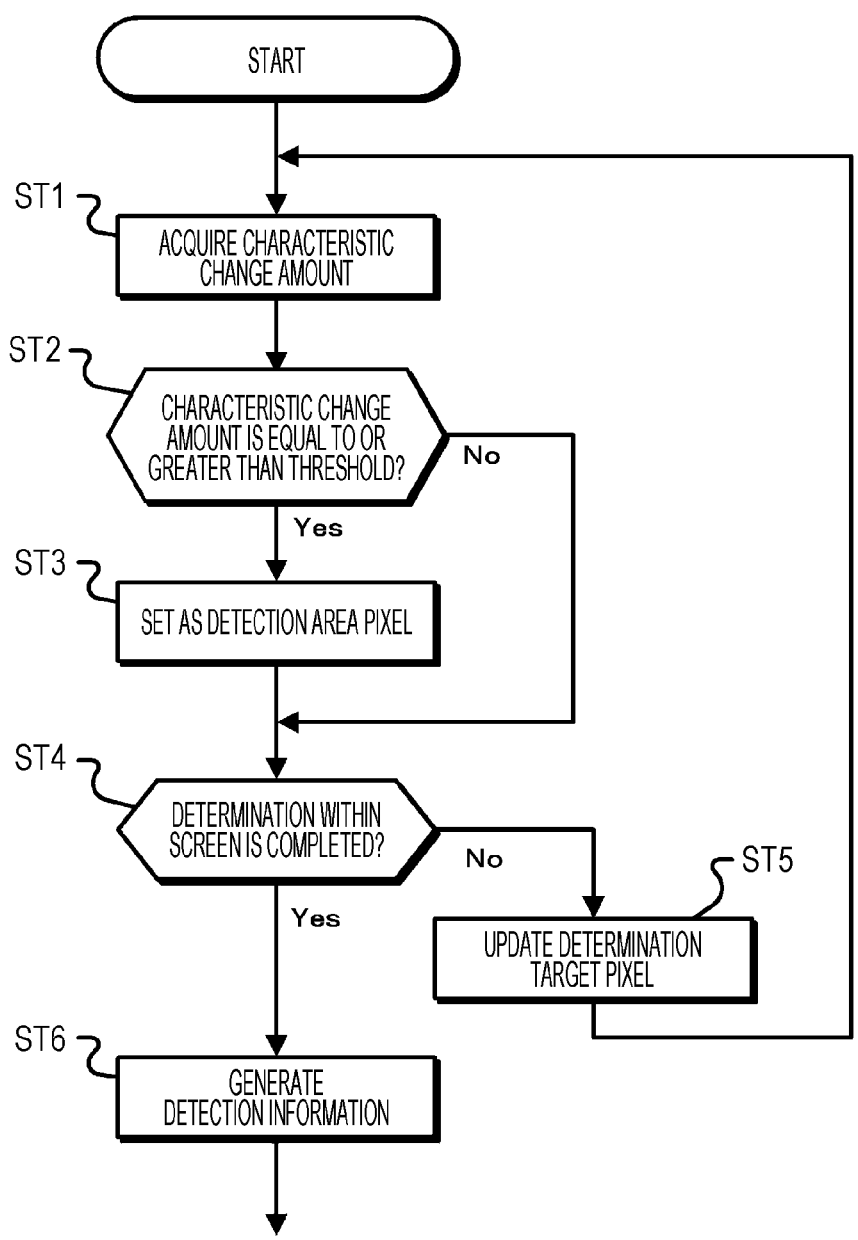
FIG. 4 is a flowchart showing a first determination processing example.

FIG. 4 is a flowchart showing a first determination processing example of an unnatural area in the first detection operation. In the first determination processing example, each pixel is sequentially set as a determination target pixel, and the dispersion of the determination target pixel is calculated for each color signal before and after matrix conversion. When a change amount of dispersion before and after matrix conversion exceeds a threshold in any color signal, the determination target pixel is determined to be a pixel of an image area (hereinafter referred to as "detection area pixel") in which a characteristic change has exceeded a predetermined change amount.

The control unit 55 performs the processing shown in FIG. 4 when an operation mode of detecting an image area having an unnatural image characteristic generated by color reproduction processing is selected. In step ST1 of FIG. 4, the control unit 55 acquires a characteristic change amount. The control unit 55 sets a determination area including multiple pixels based on the determination target pixel to an image before matrix conversion and an image after matrix conversion. The control unit 55 calculates the dispersion for each color signal using the pixel signal in the determination area in the image before matrix conversion. Additionally, the control unit 55 calculates the dispersion for each color signal using the pixel signal in the determination area in the image after matrix conversion. Furthermore, the control unit 55 calculates the change amount of dispersion before and after matrix conversion for each color signal as a characteristic change amount, and proceeds to step ST2. Note that dispersion is not limited to a statistic indicating variation in pixel values within the determination area. For example, a signal waveform in a predetermined pixel range based on the determination target pixel may be used as the dispersion within a line where the determination target pixel is located. Additionally, the determination area is not limited to an area including multiple pixels. A one-pixel area may be used as a determination area, and the pixel value of the determination target pixel may be used as the dispersion.

In step ST2, the control unit determines whether the characteristic change amount is equal to or greater than a threshold. The control unit 55 compares the characteristic change amount (dispersion change amount) acquired in step ST1 with a threshold. The threshold may be set in advance, or may be adjusted according to the image on which matrix conversion is performed. For example, the control unit 55 sets a coefficient for each attribute of the image that affects the dispersion calculated using the pixel signal, and determines a threshold adjustment coefficient for adjusting the threshold from the coefficient set for each attribute. Specifically, in a case where dispersion is calculated from an image signal, the dispersion greatly varies depending on the subject's own color, texture level, and image brightness. Hence, the control unit 55 uses the subject's own color, texture level, and image brightness as image attributes, and adjusts the threshold according to the coefficient set for each attribute. By adjusting the threshold in this way, it becomes possible to accurately detect an image area having an unnatural image characteristics as compared with a case where the threshold is fixed. Note that a texture level indicates signal level fluctuation in a predetermined processing unit, for example. When the processing unit is a flat image portion, the texture level is low, and when the processing unit is an image portion such as an edge, the texture level is high.

Equation (5) represents a threshold adjustment coefficient kth. Note that in equation (5), "kc" is a coefficient corresponding to the chroma of the subject, "kt" is a coefficient corresponding to the texture level, and "kb" is a coefficient corresponding to the brightness of the screen. The coefficient kc increases within the range of "0<kc<1" as the chroma increases. The coefficient kt increases within the range of "0<kt<1" as the texture level increases. The coefficient kb increases within the range of "0<kb<1" as the image becomes brighter.

$$kth = kc \times kt \times kb \quad (5)$$

The control unit 55 compares, with the characteristic change amount, a determination threshold Th obtained by multiplying a preset maximum threshold Thmax by the threshold adjustment coefficient kth as shown in equation (6). Note that the determination threshold Th may be calculated for each color signal, or an equal value may be used for each color signal.

$$Th = Th\,max \times kth \quad (6)$$

Additionally, the control unit 55 may weight the attribute used for calculating the threshold adjustment coefficient kth. For example, the coefficient range for an attribute to be assigned a low weight is set to a range less than "1" and larger than a lower limit value PW, and the lower limit value PW is brought closer to "1" with a lower weight. If the lower limit value PW is adjusted in this way, a change in the threshold adjustment coefficient kth is reduced for an attribute with a low weight.

Furthermore, the range of a coefficient regarding an attribute is not limited to less than "1". For example, when the attribute is a predetermined condition, the coefficient for each attribute is "1", and the threshold at this time is a standard threshold Thstd. Additionally, the control unit 55 may adjust the coefficient to a value larger or smaller than "1" according to the change in the attribute, calculate the threshold adjustment coefficient kth using the adjusted coefficient, and calculate the determination threshold Th from the calculated threshold adjustment coefficient kth and the standard threshold Thstd. Additionally, in a case of weighting the attribute, the control unit 55 changes the coefficient adjustment amount according to the weight. For example, when the weight is low, the control unit 55 reduces the adjustment amount for the change.

The control unit 55 proceeds to step ST3 if any of the characteristic change amounts for each color signal calculated in step ST1 is equal to or greater than the threshold, and proceeds to step ST4 if none of the characteristic change amounts of the color signals is equal to or greater than the threshold.

In step ST3, the control unit sets the determination target pixel as a detection area pixel. Since the characteristic change amount of the determination target pixel is equal to or greater than the threshold, the control unit 55 sets the determination target pixel as a detection area pixel and proceeds to step ST4.

In step ST4, the control unit determines whether the determination within the screen is completed. The control unit 55 proceeds to step ST5 if there is a pixel in the screen that has not been determined whether or not the pixel has undergone a characteristic change exceeding a predetermined change amount, and proceeds to step ST6 if the determination has been made for all the pixels.

In step ST5, the control unit updates the determination target pixel. The control unit 55 sets a pixel that has not been determined whether or not the pixel has undergone a characteristic change exceeding a predetermined change amount as a new determination target pixel, and returns to step ST1.

In step ST6, the control unit generates detection information. The control unit 55 generates detection information indicating an image area including the detection area pixels set in step ST3.

<3-1-2. Second Determination Processing Example of Unnatural Area>

Figure 5:
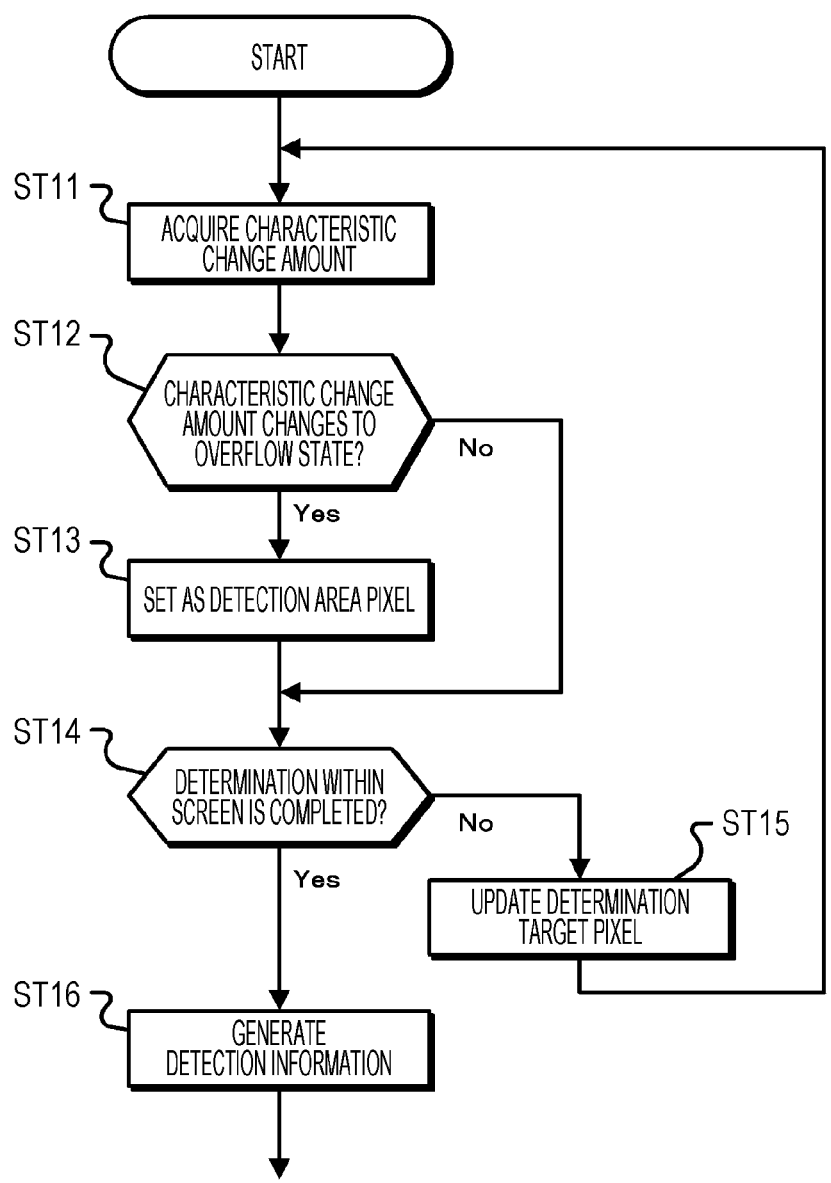
FIG. 5 is a flowchart showing a second determination processing example.

FIG. 5 is a flowchart showing a second determination processing example of an unnatural area in the first detection operation. In the second determination processing example, when an unsaturated determination target pixel before matrix conversion becomes saturated, that is, changes to an overflow state, for example, by matrix conversion, the determination target pixel is determined to be a detection area pixel having undergone a characteristic change exceeding a predetermined change amount. Note that a saturated state is not limited to an overflow state or an underflow state to be described later. A state where the pixel value of the determination target pixel after matrix conversion has reached an upper limit value or a lower limit value set by the user or the like may be regarded as a saturated state.

The control unit 55 performs the processing shown in FIG. 5 when an operation mode of detecting an image area having an unnatural image characteristic generated by color reproduction processing is selected. In step ST11 of FIG. 5, the control unit acquires a characteristic change amount. The control unit 55 uses the pixel value for each color signal after matrix conversion in the determination target pixel as the characteristic change amount of the determination target pixel, and proceeds to step ST12.

In step ST12, the control unit determines whether the characteristic change amount has changed to an overflow state. When any of the characteristic change amounts for each color signal acquired in step ST11 changes to an overflow state, that is, when an unsaturated pixel value before color signal processing changes to an overflow state after the processing, the control unit 55 proceeds to step ST13. Additionally, in other cases, that is, if the characteristic change amount is not in an overflow state or if the characteristic change amount is in an overflow state and the pixel value before processing is saturated, the control unit 55 proceeds to step ST14.

In step ST13, the control unit sets the determination target pixel as a detection area pixel. Since the determination target pixel has changed from an unsaturated state to an overflow state by matrix conversion, the control unit 55 sets the determination target pixel as a detection area pixel and proceeds to step ST14.

In step ST14, the control unit determines whether the determination within the screen is completed. The control unit 55 proceeds to step ST15 if there is a pixel in the screen that has not been determined whether or not the pixel has undergone a characteristic change exceeding a predetermined change amount, and proceeds to step ST16 if the determination has been made for all the pixels.

In step ST15, the control unit updates the determination target pixel. The control unit 55 sets a pixel that has not been determined whether or not the pixel has undergone a characteristic change exceeding a predetermined change amount as a new determination target pixel, and returns to step ST11.

In step ST16, the control unit generates detection information. The control unit 55 generates detection information indicating an image area including the detection area pixels set in step ST13.

<3-1-3. Third Determination Processing Example of Unnatural Area>

Figure 6:
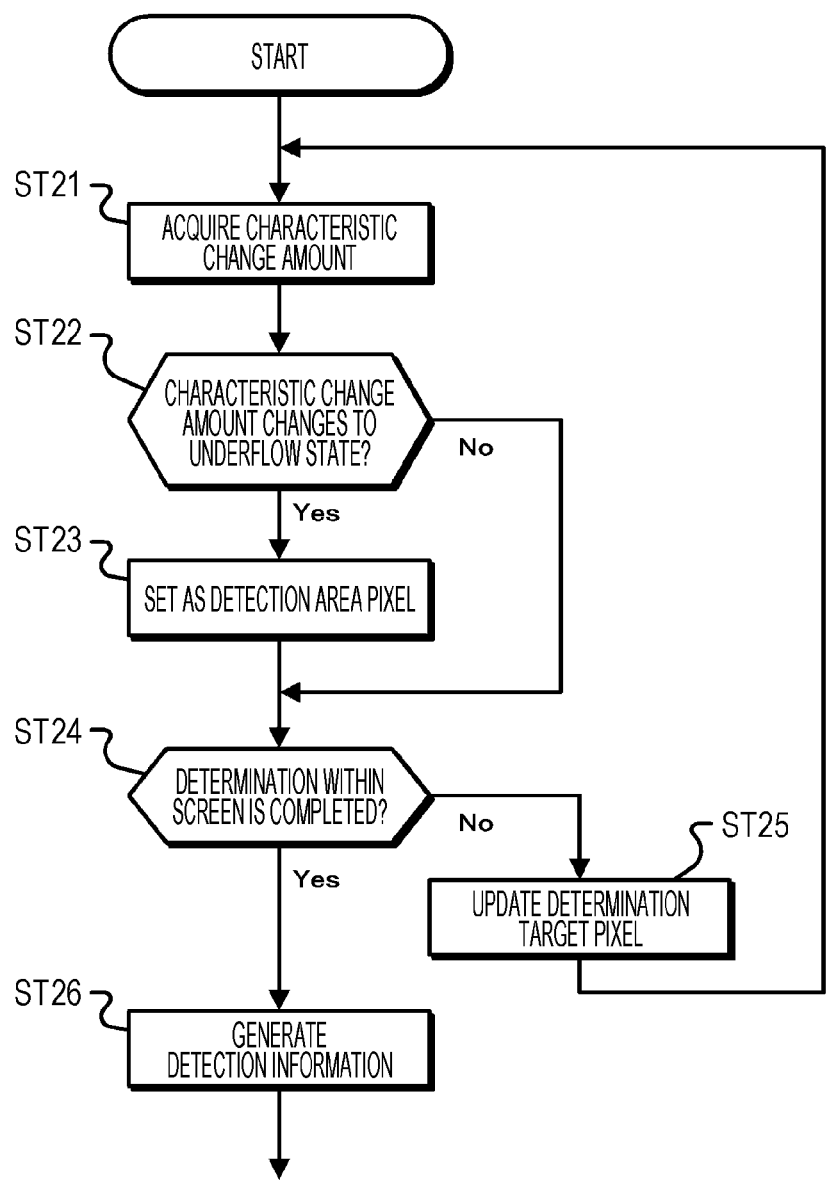
FIG. 6 is a flowchart showing a third determination processing example.

FIG. 6 is a flowchart showing a third determination processing example of an unnatural area in the first detection operation. In the third determination processing example, when an unsaturated determination target pixel before matrix conversion becomes saturated, that is, changes to an underflow state, for example, by matrix conversion, the determination target pixel is determined to be a detection area pixel having undergone a characteristic change exceeding a predetermined change amount.

The control unit 55 performs the processing shown in FIG. 6 when an operation mode of detecting an image area having an unnatural image characteristic generated by color reproduction processing is selected. In step ST21 of FIG. 6, the control unit acquires a characteristic change amount. The control unit 55 uses the pixel value for each color signal after matrix conversion in the determination target pixel as the characteristic change amount of the determination target pixel, and proceeds to step ST22.

In step ST22, the control unit determines whether the characteristic change amount has changed to an underflow state. When any of the characteristic change amounts for each color signal acquired in step ST21 changes to an underflow state, that is, when an unsaturated pixel value before color signal processing changes to an underflow state after the processing, the control unit 55 proceeds to step ST23. Additionally, in other cases, that is, if the characteristic change amount is not in an underflow state or if the characteristic change amount is in an underflow state and the pixel value before processing is saturated, the control unit 55 proceeds to step ST24.

In step ST23, the control unit sets the determination target pixel as a detection area pixel. Since the determination target pixel has changed from an unsaturated state to an underflow state by matrix conversion, the control unit 55 sets the determination target pixel as a detection area pixel and proceeds to step ST24.

In step ST24, the control unit determines whether the determination within the screen is completed. The control unit 55 proceeds to step ST25 if there is a pixel in the screen that has not been determined whether or not the pixel has undergone a characteristic change exceeding a predetermined change amount, and proceeds to step ST26 if the determination has been made for all the pixels.

In step ST25, the control unit updates the determination target pixel. The control unit 55 sets a pixel that has not been determined whether or not the pixel has undergone a characteristic change exceeding a predetermined change amount as a new determination target pixel, and returns to step ST21.

In step ST26, the control unit generates detection information. The control unit 55 generates detection information indicating an image area including the detection area pixels set in step ST23.

<3-1-4. Fourth Determination Processing Example of Unnatural Area>

Figure 7:
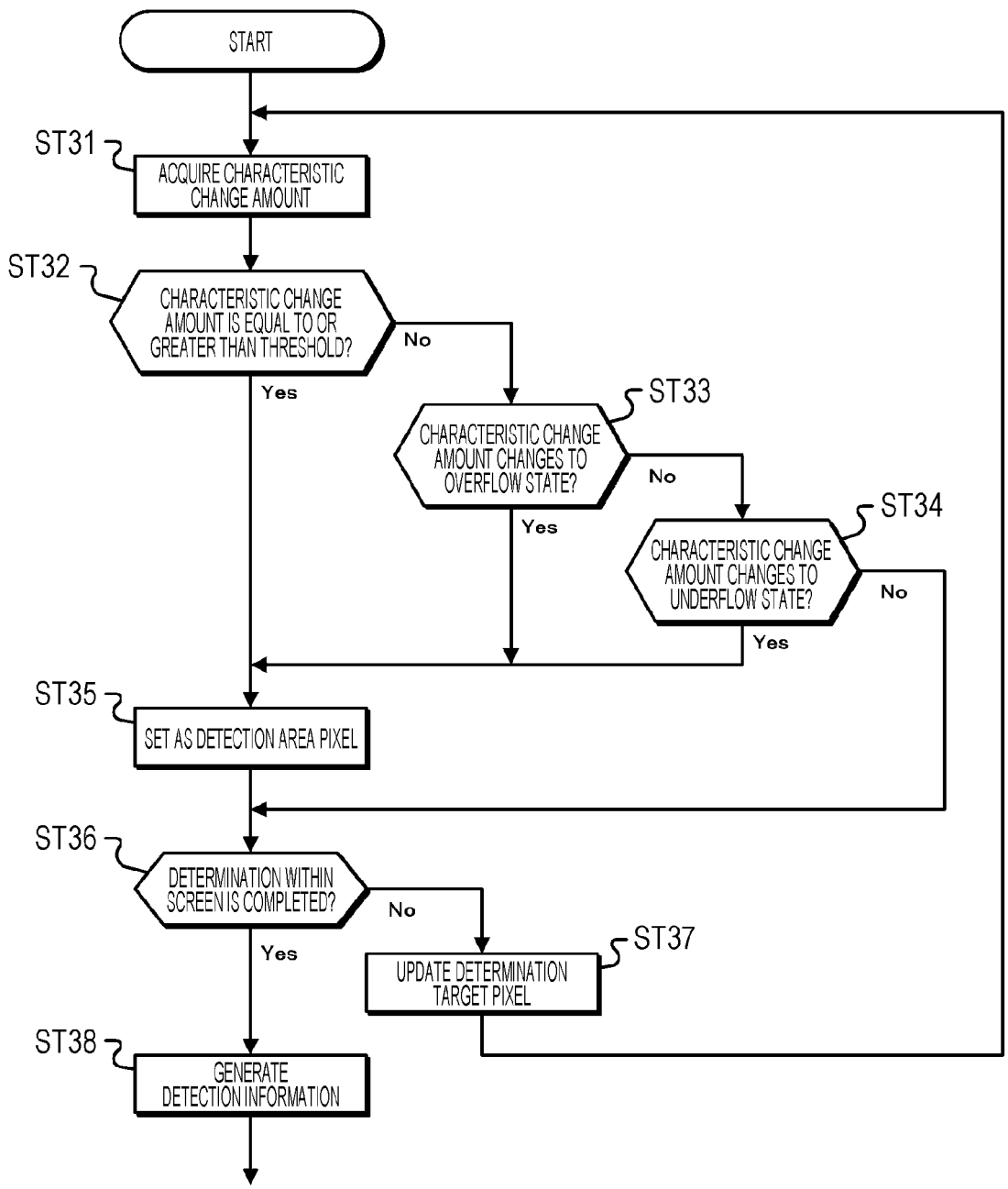
FIG. 7 is a flowchart showing a fourth determination processing example.

FIG. 7 is a flowchart showing a fourth determination processing example of an unnatural area in the first detection operation. In the fourth determination processing example, when any of the determination conditions in the first to third determination processing examples is satisfied, the determination target pixel is determined as a detection area pixel having undergone a characteristic change exceeding a predetermined change amount.

The control unit 55 performs the processing shown in FIG. 6 when an operation mode of detecting an image area having an unnatural image characteristic generated by color reproduction processing is selected. In step ST31 of FIG. 7, the control unit acquires a characteristic change amount. The control unit 55 acquires a dispersion change amount as the characteristic change amount, as similar to step ST1 of the first determination processing example. Additionally, as similar to step ST11 of the second determination processing example and step ST21 of the third determination processing example, the control unit 55 acquires the pixel value for each color signal after matrix conversion of the determination target pixel as the characteristic change amount, and proceeds to step ST32.

In step ST32, the control unit determines whether the characteristic change amount is equal to or greater than a threshold. As similar to step ST2 of the first determination processing example, the control unit 55 compares the acquired dispersion change amount with the threshold. The control unit 55 proceeds to step ST35 if the dispersion change amount is equal to or greater than the threshold, and proceeds to step ST33 if the dispersion change amount is not equal to or greater than the threshold.

In step ST33, the control unit determines whether the characteristic change amount has changed to an overflow state. As similar to step ST12 of the second determination processing example, the control unit 55 determines whether any of the pixel values of each color signal after matrix conversion has changed to an overflow state. The control unit 55 proceeds to step ST35 if the pixel value before processing for any of the color signals is unsaturated and has changed to an overflow state after the processing. Additionally, in other cases, that is, if the pixel value after matrix conversion is not in an overflow state or if the pixel value after matrix conversion is in an overflow state and the pixel value before processing is saturated, the control unit 55 proceeds to step ST34.

In step ST34, the control unit determines whether the characteristic change amount has changed to an underflow state. As similar to step ST22 of the third determination processing example, the control unit 55 determines whether any of the pixel values of each color signal after matrix conversion has changed to an underflow state. The control unit 55 proceeds to step ST35 if the pixel value before processing in any of the color signals is unsaturated and has changed to an underflow state after the processing. Additionally, in other cases, that is, if the pixel value after matrix conversion is not in an underflow state or if the pixel value after matrix conversion is in an underflow state and the pixel value before processing is saturated, the control unit 55 proceeds to step ST36.

In step ST35, the control unit sets the determination target pixel as a detection area pixel. If any of the following conditions is satisfied, the control unit 55 sets the determination target pixel as a detection area pixel and proceeds to step ST36.

Specifically, the dispersion change amount of the determination target pixel is equal to or greater than the threshold, the dispersion is equal to or greater than the threshold, the pixel value after matrix conversion is in an overflow state and was unsaturated before matrix conversion, or the pixel value after matrix conversion is in an underflow state and was unsaturated before matrix conversion.

In step ST36, the control unit determines whether the determination within the screen is completed. The control unit 55 proceeds to step ST37 if there is a pixel in the screen that has not been determined whether or not the pixel has undergone a characteristic change exceeding a predetermined change amount, and proceeds to step ST38 if the determination has been made for all the pixels.

In step ST37, the control unit updates the determination target pixel. The control unit 55 sets a pixel that has not been determined whether or not the pixel has undergone a characteristic change exceeding a predetermined change amount as a new determination target pixel, and returns to step ST31.

In step ST38, the control unit generates detection information. The control unit 55 generates detection information indicating an image area including the detection area pixels set in step ST35.

<3-1-5. Fifth Determination Processing Example of Unnatural Area>

Figure 8:
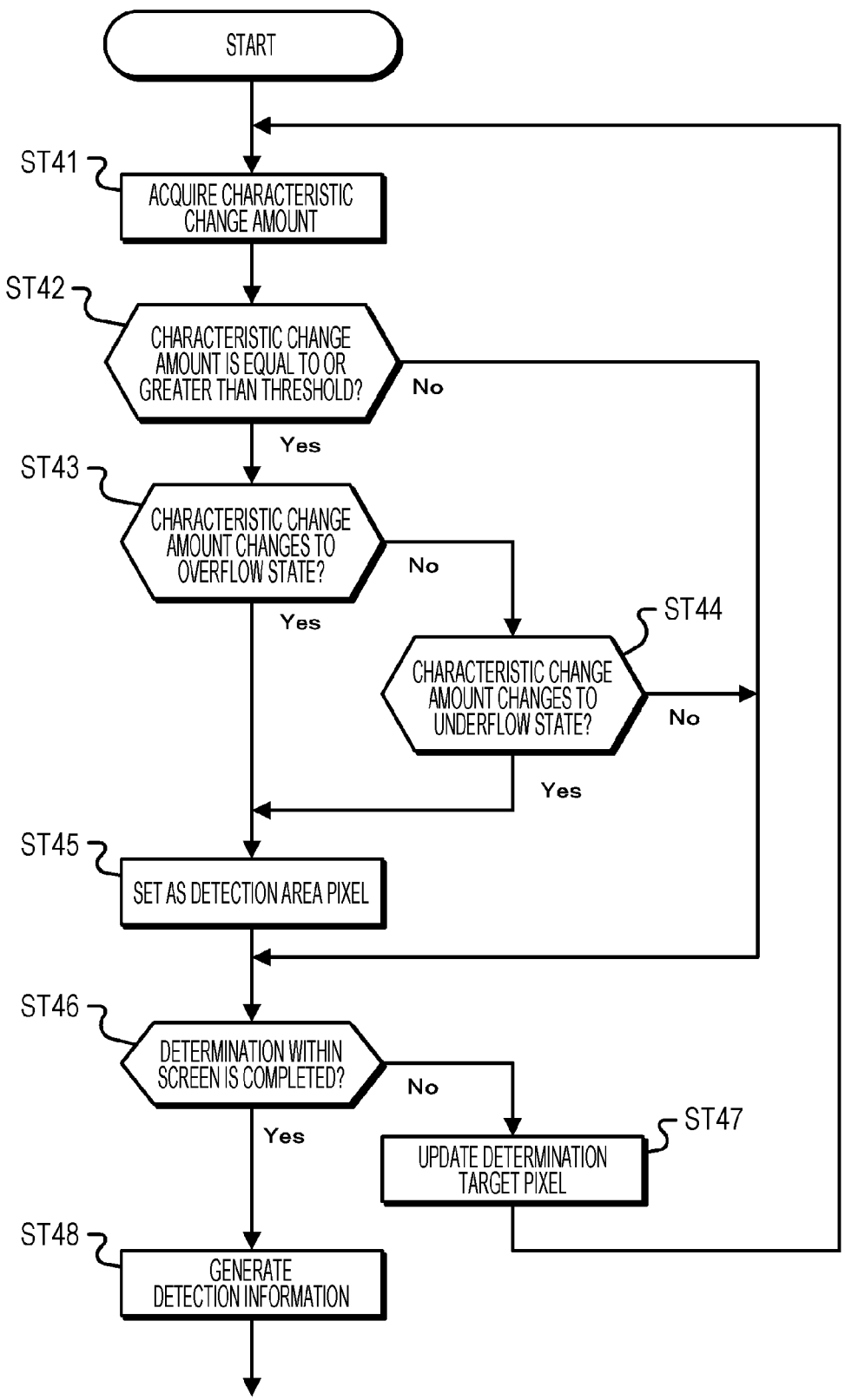
FIG. 8 is a flowchart showing a fifth determination processing example.

FIG. 8 is a flowchart showing a fifth determination processing example of an unnatural area in the first detection operation. In the fifth determination processing example, when the determination condition in the first determination processing example and any of the second determination processing example and the third determination processing example are satisfied, the determination target pixel is determined as a detection area pixel having undergone a characteristic change exceeding a predetermined change amount.

The control unit 55 performs the processing shown in FIG. 8 when an operation mode of detecting an image area having an unnatural image characteristic generated by color reproduction processing is selected. In step ST41 of FIG. 8, the control unit acquires a characteristic change amount. The control unit 55 acquires a dispersion change amount as the characteristic change amount, as similar to step ST1 of the first determination processing example. Additionally, as similar to step ST11 of the second determination processing example and step ST21 of the third determination processing example, the control unit 55 acquires the pixel value for each color signal after matrix conversion of the determination target pixel as the characteristic change amount, and proceeds to step ST42.

In step ST42, the control unit determines whether the characteristic change amount is equal to or greater than a threshold. As similar to step ST2 of the first determination processing example, the control unit 55 compares the acquired dispersion change amount with the threshold. The control unit 55 proceeds to step ST43 if the dispersion change amount is equal to or greater than the threshold, and proceeds to step ST46 if the dispersion change amount is not equal to or greater than the threshold.

In step ST43, the control unit determines whether the characteristic change amount has changed to an overflow state. As similar to step ST12 of the second determination processing example, the control unit 55 determines whether any of the pixel values of each color signal after matrix conversion has changed to an overflow state. The control unit 55 proceeds to step ST45 if the pixel value before processing for any one of the color signals is unsaturated state and has changed to an overflow state after processing. Additionally, in other cases, that is, if the pixel value after matrix conversion is not in an overflow state or if the pixel value after matrix conversion is in an overflow state and the pixel value before processing is saturated, the control unit 55 proceeds to step ST44.

In step ST44, the control unit determines whether the characteristic change amount has changed to an underflow state. As similar to step ST22 of the third determination processing example, the control unit 55 determines whether any of the pixel values of each color signal after matrix conversion has changed to an underflow state. The control unit 55 proceeds to step ST45 if the pixel value before processing in any of the color signals is unsaturated and has changed to an underflow state after the processing. Additionally, in other cases, that is, if the pixel value after matrix conversion is not in an underflow state or if the pixel value after matrix conversion is in an underflow state and the pixel value before processing is saturated, the control unit 55 proceeds to step ST46.

In step ST45, the control unit sets the determination target pixel as a detection area pixel. The control unit 55 sets the determination target pixel as a detection area pixel and proceeds to step ST46 if the dispersion change amount of the determination target pixel is equal to or greater than the threshold, and either the pixel value after matrix conversion is in an overflow state and was unsaturated before matrix conversion, or the pixel value after matrix conversion is in an underflow state and was unsaturated before matrix conversion.

In step ST46, the control unit determines whether the determination within the screen is completed. The control unit 55 proceeds to step ST47 if there is a pixel in the screen that has not been determined whether or not the pixel has undergone a characteristic change exceeding a predetermined change amount, and proceeds to step ST48 if the determination has been made for all the pixels.

In step ST47, the control unit updates the determination target pixel. The control unit 55 sets a pixel that has not been determined whether or not the pixel has undergone a characteristic change exceeding a predetermined change amount as a new determination target pixel, and returns to step ST41.

In step ST48, the control unit generates detection information. The control unit 55 generates detection information indicating an image area including the detection area pixels set in step ST45.

Note that the control unit 55 may set the determination target pixel as a detection area pixel when all the determination conditions of the first to third determination processing examples are satisfied.

As described above, the control unit 55 performs any of the determination processing described above, sequentially sets each pixel as a determination target pixel, determines whether the determination target pixel is a detection area pixel that is a pixel of an image area having undergone a characteristic change exceeding a predetermined change amount, and generates detection information indicating an image area including the detection area pixel. Further, the control unit 55 controls the signal output unit 42 to output the detection information to an external device in association with a processed image signal, or controls the recording unit 41 to record the detection information on a recording medium in association with a processed image signal.

Further, the control unit 55 may warn the user on the basis of the detection information. For example, the control unit 55 outputs detection information to the signal processing unit 30 to superimpose a warning display signal based on the detection information on the image signal. In this case, in the image displayed on the display unit 43 on the basis of the image signal processed by the signal processing unit 30, for example, a warning display image (e.g., a zebra pattern or the like) is provided in an image area having undergone a characteristic change exceeding a predetermined change amount. Hence, the user can easily determine in real time which image area has come to have an unnatural image characteristic by performing color reproduction processing. Note that the warning display image may be provided as an icon display or the like indicating that an image area having an unnatural image characteristic has been generated. Additionally, the control unit 55 is not limited to giving a warning using an image, and may give a warning using means such as sound, vibration, a warning lamp, or the like. Furthermore, if these warnings are performed in combination, it is possible to more surely recognize that an image area having an unnatural image characteristic has been generated by color reproduction processing.

Additionally, if a warning display image is provided for each frame, the warning display image may be overlooked in the case of a short frame period in which an image area (unnatural area) having undergone a characteristic change exceeding a predetermined change amount is detected. Additionally, when correcting an image of an unnatural area, it is necessary to perform unnatural area determination processing for each frame. Hence, the control unit 55 may perform the unnatural area determination processing for each frame, and the warning display image may be provided for a predetermined period when an unnatural area is detected.

FIG. 9 shows an operation example of the imaging device. Here, (a) of FIG. 9 shows an image before matrix conversion, and (b) of FIG. 9 shows the three primary color signals Rin, Gin, and Bin at a line position Ls in the image before matrix conversion. Additionally, (c) of FIG. 9 shows an image after matrix conversion, and (d) of FIG. 9 shows the three primary color signals Rout, Gout, and Bout at the line position Ls in the image after matrix conversion. Further, (e) of FIG. 9 illustrates a case where a warning display image WD is superimposed on the image after matrix conversion.

For example, in (d) of FIG. 9, the red signal Rout and the green signal Gout after matrix conversion are changed to an underflow state due to the influence of the blue signal Bin having a high signal level. In (e) of FIG. 9, warning display images WD indicating image areas in an underflow state are provided so that an image area in which an unnatural color gradation conversion has occurred can be easily identified. Note that while FIG. 9 illustrates the case where the red signal and the green signal after matrix conversion are underflowed due to the influence of the blue signal having a high signal level, the light source of an input image and illumination light or the spectral characteristic of the imaging unit may cause the same phenomenon to occur in other colors. Even in such a case, by performing the above-described processing, it is possible to easily detect the image area where unnatural color gradation conversion has been performed.

As described above, by performing the first detection operation, even if an image area having an unnatural image characteristic due to matrix conversion such as an image area in which gradation is largely degraded due to matrix conversion is generated, the area can be detected easily in real time. Further, since the determination as to whether it is a detection area pixel is made in pixel units as described above, an image area having an unnatural image quality characteristic due to matrix conversion can be specified with high accuracy.

<3-2. Second Detection Operation>

In a second detection operation, a case will be described in which white balance adjustment is performed as color reproduction processing, and an image area having undergone a characteristic change exceeding a predetermined change amount is detected by white balance adjustment. In this case, the control unit 55 acquires an image signal before white balance adjustment from the color reproduction processing unit 33 and retains the image signal. Additionally, the control unit 55 acquires an image signal after white balance adjustment from the color reproduction processing unit 33, and detects an image area adjusted to an unnatural color, from the image signals before and after white balance adjustment of the same frame.

The control unit 55 performs processing similar to any of the first determination processing example to the fifth determination processing example in the first detection operation using the image signals before and after white balance adjustment. That is, the control unit 55 performs processing similar to the first detection operation on the basis of a dispersion change amount calculated using the image signals before and after white balance adjustment, and the change in the saturation state of the image signal due to white balance adjustment, to generate detection information indicating an image area adjusted to an unnatural color by white balance adjustment.

Additionally, in the second detection operation, when comparing the dispersion change amount and a threshold as a characteristic change amount, the control unit 55 may adjust the threshold by using the threshold adjustment coefficient kth calculated as described above, by setting a coefficient for each attribute of the image that affects the dispersion calculated from the image signals before and after white balance adjustment.

As described above, in the second detection operation, even if an image area that has been adjusted to an unnatural color by white balance adjustment is generated, the image area can be detected in real time. Additionally, as similar to the first detection operation, since the determination as to whether it is a detection area pixel is made in pixel units, an image area adjusted to an unnatural color by white balance adjustment can be specified with high accuracy.

Additionally, in the second detection operation, as similar to the first detection operation, a warning may be given to the user on the basis of detection information, or detection information may be associated with an image signal after color reproduction processing to be recorded or output to an external device. Furthermore, in the case of giving a warning to the user on the basis of detection information, by using a warning display image different from that of the first detection operation, or a warning display image according to the detection result of the first detection operation and the detection result of the second detection operation, the difference in warning display image makes it possible to detect which processing an image area having an unnatural image quality characteristic is generated.

<3-3. Third Detection Operation>

In a third detection operation, a case will be described in which user specified color conversion is performed as color reproduction processing, and an image area having undergone a characteristic change exceeding a predetermined change amount is detected by the user specified color conversion. In user specified color conversion, processing such as gamma correction, color grading, and color space conversion are performed as described above. Here, for simplicity of explanation, only a case where color grading using a look up table (LUT) is performed will be described, and color grading using a LUT is referred to as LUT conversion. The LUT is generated in advance for the user to perform desired color conversion, and is stored in the user specified color converter.

LUT conversion can be categorized into processing using a one-dimensional 1DLUT (e.g., tone conversion) and processing using a three-dimensional 3DLUT (e.g., processing of achieving desired tone and chroma even if there is change in chroma due to tone conversion). Additionally, these processing may be performed independently or in combination, depending on the purpose. Furthermore, 1DLUT and 3DLUT have various table numbers and accuracy. When natural processing is performed, the control unit 55 determines the determination target pixel by assuming that the change amount is not large between the dispersion calculated from the image signal before LUT conversion and the dispersion calculated from the image signal after LUT conversion in the determination target pixel. Additionally, when natural processing is performed, the control unit 55 determines the determination target pixel by assuming that an unsaturated image signal rarely enters an overflow state or an underflow state after LUT conversion. Specifically, the control unit 55 performs processing similar to any of the first determination processing example to the fifth determination processing example in the first detection operation using the image signals before and after LUT conversion processing. That is, the control unit 55 performs processing similar to the first detection operation on the basis of a dispersion change amount calculated using the image signals before and after LUT conversion processing, and the change in the saturation state of the image signal due to LUT conversion processing, to generate detection information indicating an image area having undergone unnatural conversion processing by LUT conversion processing. Note that in the third detection operation, detection information indicating the image area having undergone unnatural conversion processing may be generated by using the image signals before and after color conversion, for each user specified color converter of the first to n-th user specified color converters 335-1 to 335-n. Additionally, detection information indicating the image area having undergone unnatural conversion processing may be generated by using an image signal input into the first user specified color converter and an image signal output from the last user specified color converter among the multiple user specified color converters that perform processing successively.

As described above, in the third detection operation, even if an image area having an unnatural image characteristic is generated by user specified color conversion, the image area can be detected in real time. Additionally, as similar to the first detection operation, since the determination as to whether it is a detection area pixel is made in pixel units, an image area having an unnatural image characteristic due to user specified color conversion can be specified with high accuracy.

Additionally, in the third detection operation, as similar to the first and second detection operations, a warning may be given to the user on the basis of detection information, or detection information may be associated with an image signal after color reproduction processing to be recorded or output to an external device. Furthermore, in the case of giving a warning to the user on the basis of detection information, by using a warning display image different from those of the first and second detection operations, the difference in warning display image makes it possible to detect which processing an image area having an unnatural image quality characteristic is generated.

<3-4. Fourth Detection Operation>

In the first to third detection operations described above, the operation of detecting an image area having an unnatural image characteristic generated by color reproduction processing on the basis of image signals before and after color reproduction processing has been described. Next, in the fourth detection operation, a case will be described in which a sensor unit that estimates illumination light is provided separately from the imaging unit 22, and a sensor signal output from the sensor unit is also used to detect whether or not unnatural color reproduction processing could occur.

Figure 10:
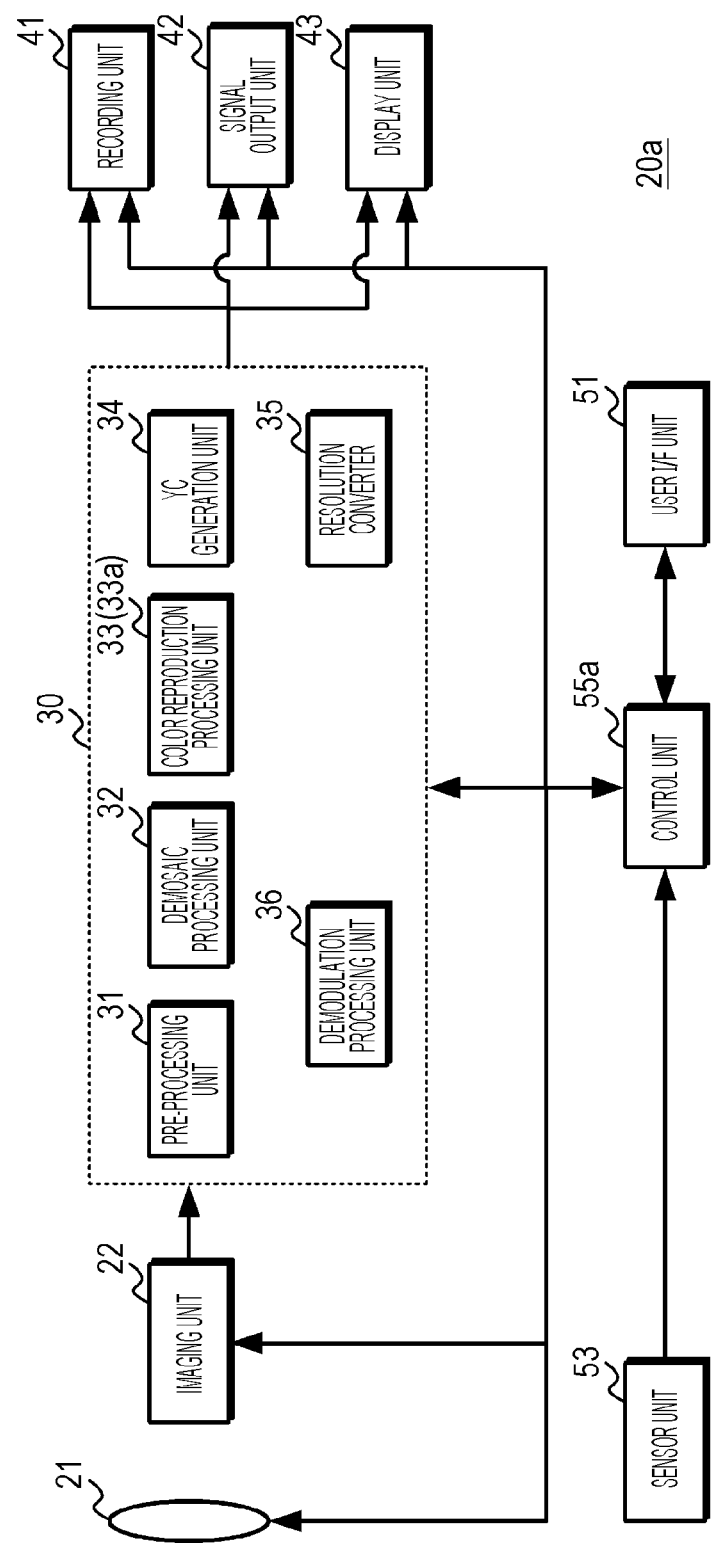
FIG. 10 is a diagram illustrating a configuration of an imaging device when performing a fourth detection operation.

FIG. 10 illustrates a configuration of the imaging device when performing the fourth detection operation. Note that in FIG. 10, parts corresponding to those of the imaging device shown in FIG. 2 performing any of the first to third detection operations are denoted by the same reference numerals.

An imaging device 20a has an imaging optical system 21, an imaging unit 22, a signal processing unit 30, a recording unit 41, a signal output unit 42, a display unit 43, a user interface (I/F) unit 51, a sensor unit 53, and a control unit 55a.

The imaging optical system 21 includes a focus lens, a zoom lens, and the like, and drives the focus lens, the zoom lens, and the like on the basis of a control signal from the control unit 55a to form a subject optical image on an imaging surface of the imaging unit 22.

An image sensor such as a complementary metal oxide semiconductor (CMOS), a charge coupled device (CCD), or the like is used as the imaging unit 22. The imaging portion 22 generates an image signal corresponding to the subject optical image, and outputs the image signal to the signal processing unit 30.

The signal processing unit 30 includes a pre-processing unit 31, a demosaic processing unit 32, a color reproduction processing unit 33, a YC generation unit 34, and a resolution converter 35. Note that the signal processing unit 30 may omit some functional blocks as described above, or may have functional blocks not shown in FIG. 10.

The pre-processing unit 31 of the signal processing unit 30 performs noise removal processing, gain adjustment processing, analog/digital conversion processing, defective pixel correction, and the like on the image signal generated by the imaging unit 22.

The demosaic processing unit 32 performs demosaic processing using the image signal processed by the pre-processing unit 31 to generate an image signal in which one pixel indicates each of the color components from an image signal in which one pixel indicates one color component, and outputs the image signal to the color reproduction processing unit 33.

The color reproduction processing unit 33 performs white balance adjustment, matrix conversion, user specified color conversion, and the like, and outputs the image signal after the color reproduction processing to the YC generation unit 34.

The YC generation unit 34 generates a luminance signal and a color difference signal from the image signal processed by the color reproduction processing unit 33. Additionally, the resolution converter 35 converts the image signal and the like after color reproduction processing output from the color reproduction processing unit 33 into an image signal of recording resolution or display resolution, and outputs the image signal of recording resolution to the recording unit 41 and the image signal of display resolution to the display unit 43. Additionally, the demodulation processing unit 36 performs demodulation processing for acquiring demodulation values used for auto focus (AF) processing, auto exposure (AE) processing, auto white balance (AWB) processing, and the like, and outputs the acquired demodulation value to the control unit 55a.

The recording unit 41 records, to the recording medium, an image signal processed by the color reproduction processing unit 33 or a luminance signal and color difference signal generated by the YC generation unit 34, and an image signal or a luminance signal and color difference signal converted into a recording resolution by the resolution converter 35. Additionally, the recording unit 41 records, on the recording medium, detection information supplied from the control unit 55a in association with the signal to be recorded. The signal output unit 42 outputs the image signal processed by the color reproduction processing unit 33 or the luminance signal and color difference signal generated by the YC generation unit 34 to an external device. Additionally, the signal output unit 42 outputs the detection information supplied from the control unit 55a in association with the signal output to the external device.

A liquid crystal display element, an organic EL display element, or the like is used as the display unit 43. The display unit 43 displays an image on the basis of the image signal after color reproduction processing converted into the display resolution by the resolution converter 35. The display unit 43 also displays a menu, operation settings, operation states, and the like of the imaging device 20, on the basis of a control signal from the control unit 55. Further, the display unit 43 can identify an image area in which a characteristic change exceeds a predetermined change amount in the displayed image based on the image signal after color reproduction processing.

A liquid crystal display element, an organic EL display element, or the like is used as the display unit 43. The display unit 43 displays an image on the basis of the image signal after color reproduction processing converted into the display resolution by the resolution converter 35. The display unit 43 also displays a menu, operation settings, operation states, and the like of the imaging device 20. Further, the display unit 43 can identify an image area in which a characteristic change exceeds a predetermined change amount in the displayed image based on the image signal after color reproduction processing.

The user interface (I/F) unit 51 includes an operation switch or an operation button, an operation dial, a remote control signal receiving portion, and the like, and generates and outputs an operation signal corresponding to a user operation to the control unit 55.

A multispectral sensor or a hyperspectral sensor is used as the sensor unit 53, for example. A multispectral sensor has a higher wavelength resolution than the imaging unit 22 and can acquire a spectral image in a wide spectral range, and a hyperspectral sensor can acquire a spectral image with a higher wavelength resolution than the multispectral sensor. The sensor unit 53 generates a wide-spectrum sensor signal (spectral image signal) having a higher wavelength resolution than the imaging unit 22, and outputs the sensor signal to the control unit 55a.

The control unit 55a has a central processing unit (CPU), a read only memory (ROM), a random access memory (RAM), and other parts. The read only memory (ROM) stores various programs executed by a central processing unit (CPU). The random access memory (RAM) stores information such as various parameters. The CPU executes various programs stored in the ROM, and controls each unit so that an operation corresponding to a user operation is performed in the imaging device 20 on the basis of an operation signal from the user interface unit 51. Additionally, the control unit 55a performs auto focus (AF) control, auto exposure (AE) control, and the like, on the basis of the demodulation value acquired by the demodulation processing unit 36 of the signal processing unit 30.

Further, the control unit 55a detects whether an image area having an unnatural image characteristic could be generated by color reproduction processing, on the basis of the demodulation result of the color reproduction processing unit 33 and the sensor signal (spectral image signal) supplied from the sensor unit 53. The control unit 55a can output a situation detection result to the signal processing unit 30, or include the situation detection result in detection information. The control unit 55a indicates, in the situation detection result, whether or not illumination light determined by the processing operation in the color reproduction processing unit 33 and illumination light determined on the basis of a sensor signal supplied from the sensor unit 53 coincide with each other. Additionally, the control unit 55a may include, in the situation detection result, information indicating the illumination light determined by the processing operation in the color reproduction processing unit 33 and information indicating the illumination light determined on the basis of the sensor signal supplied from the sensor unit 53.

In the imaging device 20a configured as described above, the sensor unit 53 has a higher wavelength resolution than the imaging unit 22, and can acquire a spectral image having a wide spectrum. For this reason, the control unit 55a can estimate a light source with higher accuracy than in the case of estimating a light source using an image signal generated by the imaging unit 22. Hence, in the fourth detection operation, the control unit 55a compares the light source estimation result based on the spectral image signal generated by the sensor unit 53 with the light source estimation result (e.g., light source estimation result used in white balance adjustment in color reproduction processing unit 33) based on the image signal generated by the imaging unit 22, and if the light source estimation results are different, the control unit 55a detects that unnatural color reproduction processing could occur and generates detection information.

As described above, in the fourth detection operation, by using the detection result of the sensor unit having a higher wavelength resolution than the imaging unit, it is possible to accurately determine whether unnatural color reproduction processing could occur. Additionally, if the user is notified of the situation determination result it is possible to grasp whether or not the imaging is performed in a situation where unnatural color reproduction processing could occur at the start of the imaging, for example.

<4. Unnatural Area Correction Operation>

Next, a description will be given of a case where a correction operation for reducing the unnaturalness is performed on an image area detected by the unnatural area detection operation. In the unnatural area correction operation, an image signal after color reproduction processing and an image signal not subjected to color reproduction processing are blended, and a blend ratio of blend processing is set according to a detection result of whether the characteristic change exceeds a predetermined change amount.

Figure 11:
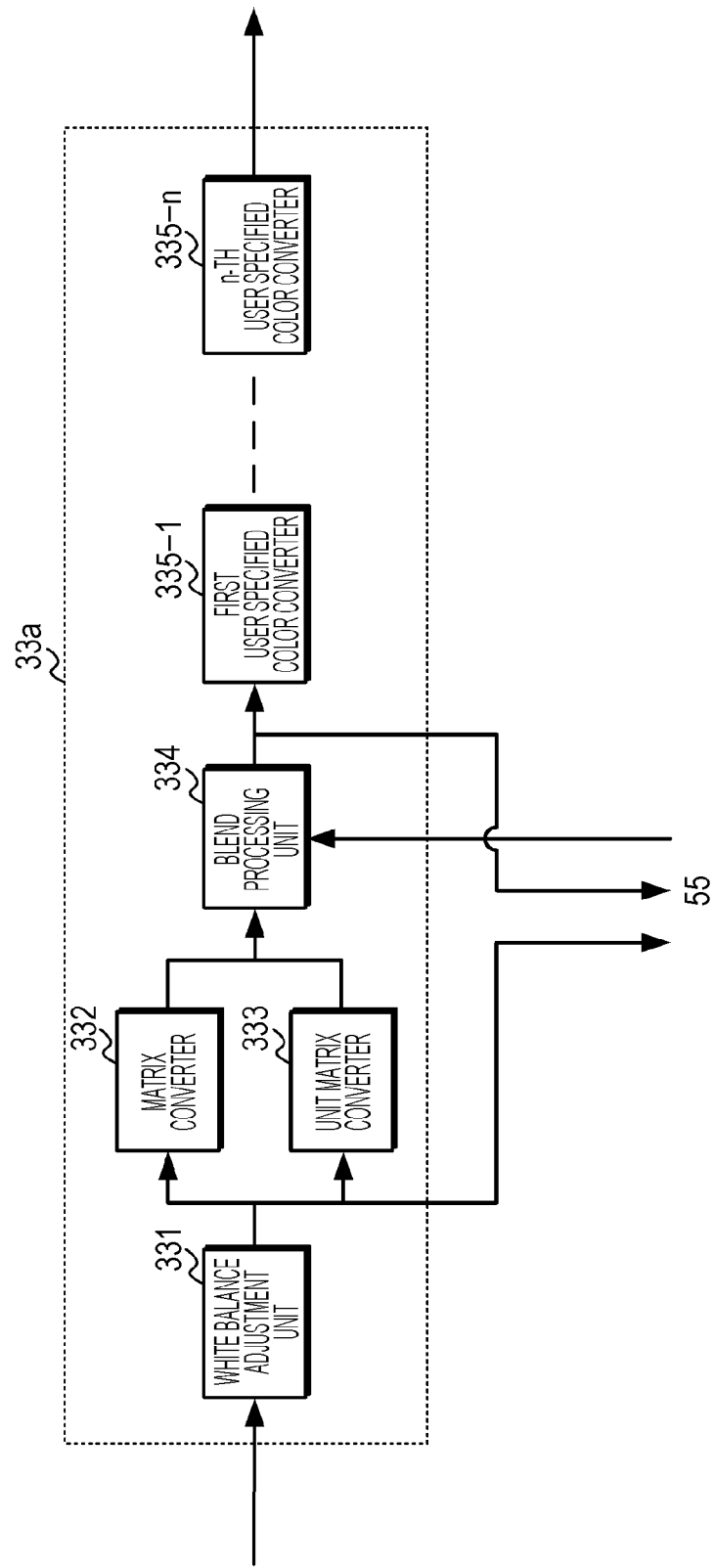
FIG. 11 is a diagram illustrating a configuration of a color reproduction processing unit when performing a correction operation.

FIG. 11 illustrates a configuration of a color reproduction processing unit when performing a correction operation for reducing unnaturalness. Note that the configuration example shown in FIG. 11 shows a configuration in a case where a correction operation is performed on an image area having an unnatural image characteristic generated by matrix conversion.

A color reproduction processing unit 33a has a white balance adjustment unit 331, a matrix converter 332, a unit matrix converter 333, a blend processing unit 334, and a first user specified color converter 335-1 to an n-th user specified converter 335-n.

The white balance adjustment unit 331 corrects an imbalance among colors caused by a difference in the color temperature environment of the subject, a difference in sensitivity of the color filter used in the imaging unit 22, and the like. The white balance adjustment unit 331 outputs the image signal after white balance adjustment to the matrix converter 332, the unit matrix converter 333, and the control unit 55 (55a).

The matrix converter 332 performs a matrix operation on each color signal using matrix coefficients in order to improve color reproducibility. Note that the matrix coefficients are provided in the form of a table in advance, and the matrix converter 332 performs matrix operation using matrix coefficients of a table corresponding to the color temperature or the like of illumination light, for example. The matrix converter 332 outputs the image signal after matrix conversion to the blend processing unit 334 and the control unit 55 (55a).

The unit matrix converter 333 performs a matrix operation on each color signal by setting the matrix coefficient to an equal fixed value (e.g., "1"). The unit matrix converter 333 outputs the image signal after matrix conversion to the blend processing unit 334. Note that by setting the equal fixed value, the image signal after matrix operation is an image signal that is not subjected to color reproduction processing and is adjusted with the same gain for each color signal. For example, when all matrix coefficients are set to "1", The image signal after matrix operation is equal to the image signal before matrix operation.

The blend processing unit 334 performs blend processing of the image signal supplied from the matrix converter 332 and the image signal supplied from the unit matrix converter 333. The blend processing unit 334 blends the image signals with a blend ratio α instructed from the control unit 55, and outputs the image signal after blend processing to the first user specified color converter 335-1.

The first to n-th user specified color converters 335-1 to 335-n perform color conversion specified by an operation signal from the user interface unit 51.

As similar to the first detection operation described above, the control unit 55 (55a) detects an image area having an unnatural image characteristic generated by matrix conversion from the image signals before and after matrix conversion by the matrix converter 332. Further, the control unit 55 (55a) sets the blend ratio on the basis of blend ratio determination elements such as the dispersion change amount, how frequent pixels become saturated from an unsaturated state by matrix conversion, how frequent the dispersion change amount of a pixel exceeds a threshold, and the area and position of an image area including image pixels saturated from an unsaturated state by matrix conversion. Then, the control unit 55 (55a) outputs a control signal indicating the set blend ratio to the blend processing unit 334. For example, the control unit 55 (55a) increases the ratio of the image signal supplied from the unit matrix converter 333 with increase in the dispersion change amount, and makes unnatural color gradation in the matrix converter 332 inconspicuous. Additionally, the control unit 55 (55a) increases the ratio of the image signal supplied from the unit matrix converter 333 with increase in the frequency of the pixels that are saturated from the unsaturated state by matrix conversion, and makes pixels of unnatural color gradation in the image processed by the matrix converter 332 inconspicuous. Additionally, the control unit 55 (55a) may set a blend ratio by using multiple determination results related to the blend ratio determination elements described above in combination, and set the blend ratio by weighting the determination results related to the blend ratio determination elements. Furthermore, the control unit 55 (55a) may set the blend ratio to a predetermined value that is set in advance when any of the determination results related to the blend ratio determination elements is a predetermined determination result, for example.

Incidentally, a characteristic change exceeding a predetermined change amount caused by color reproduction processing is likely to generate an edge portion as compared with a flat portion of the subject. Hence, the demodulation processing unit 36 of the signal processing unit 30 can perform edge detection, and the control unit 55 (55a) can perform blend processing on the edge portion detected by the demodulation processing unit 36, for example. Alternatively, the control unit 55 (55a) can set the blend ratio so that the ratio of the image signal supplied from the unit matrix converter 333 is lower in the flat portion than in the edge portion, for example. The control unit 55 (55a) can avoid the unnaturalness by setting the blend ratio in this way and weakening color reproduction processing at the edge portion, for example.

Note that while the correction operation for an image area having an unnatural image characteristic generated by matrix conversion has been described in the above-described correction operation, similar processing can be performed for white balance adjustment and user specified color conversion. That is, the control unit can set the blend ratio according to the detection result of a characteristic change exceeding a predetermined change amount, and the color reproduction processing unit can blend the processed image signal and the unprocessed image signal according to the blend ratio set by the control unit. Thus, an image area having an unnatural image characteristic can be corrected.

Additionally, if the color reproduction processing unit 33a performs a correction operation to reduce unnaturalness, the post processing load can be reduced when performing post processing of the image signal generated by the imaging device 20 (20a).

<5. Application Example>

The technology according to the present disclosure (present technology) can be applied to various products. For example, the technology according to the present disclosure can be implemented as a device mounted on any of types of mobile objects such as an automobile, an electric vehicle, a hybrid electric vehicle, a motorcycle, a bicycle, personal mobility, an airplane, a drone, a ship, and a robot.

Figure 12:
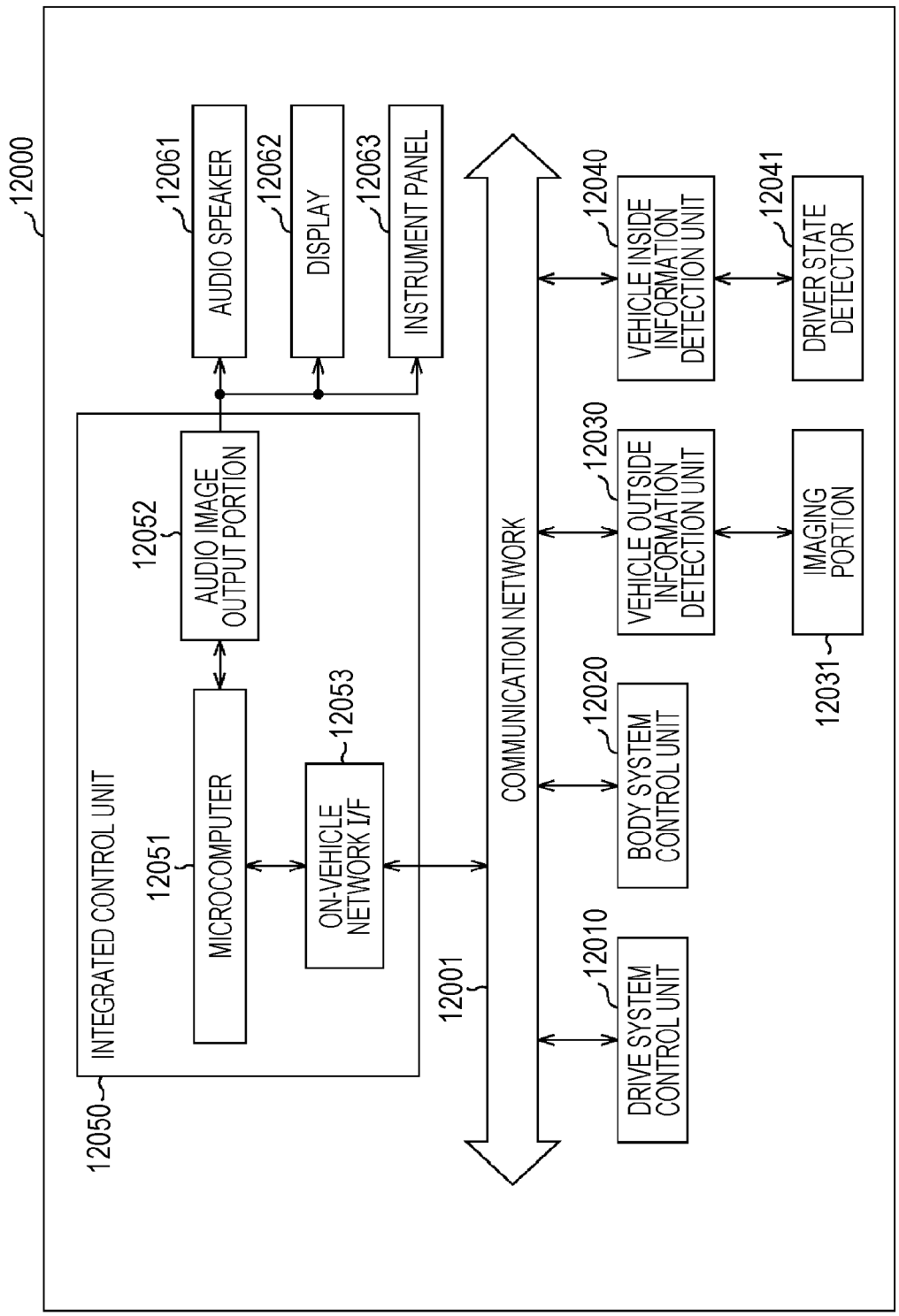
FIG. 12 is a block diagram showing an example of a schematic configuration of a vehicle control system.

FIG. 12 is a block diagram showing a schematic configuration example of a vehicle control system which is an example of a mobile control system to which the technology according to the present disclosure can be applied.

A vehicle control system 12000 includes multiple electronic control units connected through a communication network 12001. In the example shown in FIG. 15, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an on-vehicle network interface (I/F) 12053 are illustrated.

The drive system control unit 12010 controls the operation of devices related to the drive system of the vehicle according to various programs. For example, the drive system control unit 12010 functions as a drive force generation device for generating a drive force of a vehicle such as an internal combustion engine or a drive motor, a drive force transmission mechanism for transmitting the drive force to wheels, a steering mechanism that adjusts the steering angle of the vehicle, and a controller such as a braking device that generates a braking force of the vehicle.

The body system control unit 12020 controls the operation of various devices equipped on the vehicle body according to various programs. For example, the body system control unit 12020 functions as a controller of a keyless entry system, a smart key system, a power window device, or a controller of various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp and the like of the vehicle.

The outside information detection unit 12030 detects information outside the vehicle equipped with the vehicle control system 12000. For example, an imaging portion 12031 is connected to the outside information detection unit 12030. The outside information detection unit 12030 causes the imaging portion 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging portion 12031 is an optical sensor that receives light and outputs an electrical signal corresponding to the amount of light received. The imaging portion 12031 can output an electric signal as an image or can output the electrical signal as distance measurement information. Additionally, the light received by the imaging portion 12031 may be visible light or non-visible light such as infrared light.

The inside information detection unit 12040 detects information inside the vehicle. For example, a driver state detector 12041 that detects a state of a driver is connected to the inside information detection unit 12040. The driver state detector 12041 includes a camera for capturing an image of the driver, for example, and the inside information detection unit 12040 may calculate the degree of fatigue or concentration of the driver or determine whether the driver is asleep, on the basis of the detection information input from the driver state detector 12041.

The microcomputer 12051 can calculate a control target value of the drive force generation device, the steering mechanism or the braking device on the basis of the information outside or inside the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information outside the vehicle acquired by the outside information detection unit 12030. For example, the microcomputer 12051 can control the headlamp according to the position of the preceding vehicle or oncoming vehicle detected by the outside information detection unit 12030, and perform cooperative control aimed for glare prevention such as switching from high beam to low beam.

The audio image output portion 12052 transmits an output signal of at least one of audio or image to an output device capable of visually or aurally notifying information to a passenger of the vehicle or to the outside of the vehicle. In the example of FIG. 12, an audio speaker 12061, a display 12062, and an instrument panel 12063 are illustrated as examples of the output device. The display 12062 may include at least one of an onboard display or a head-up display, for example.

Figure 13:
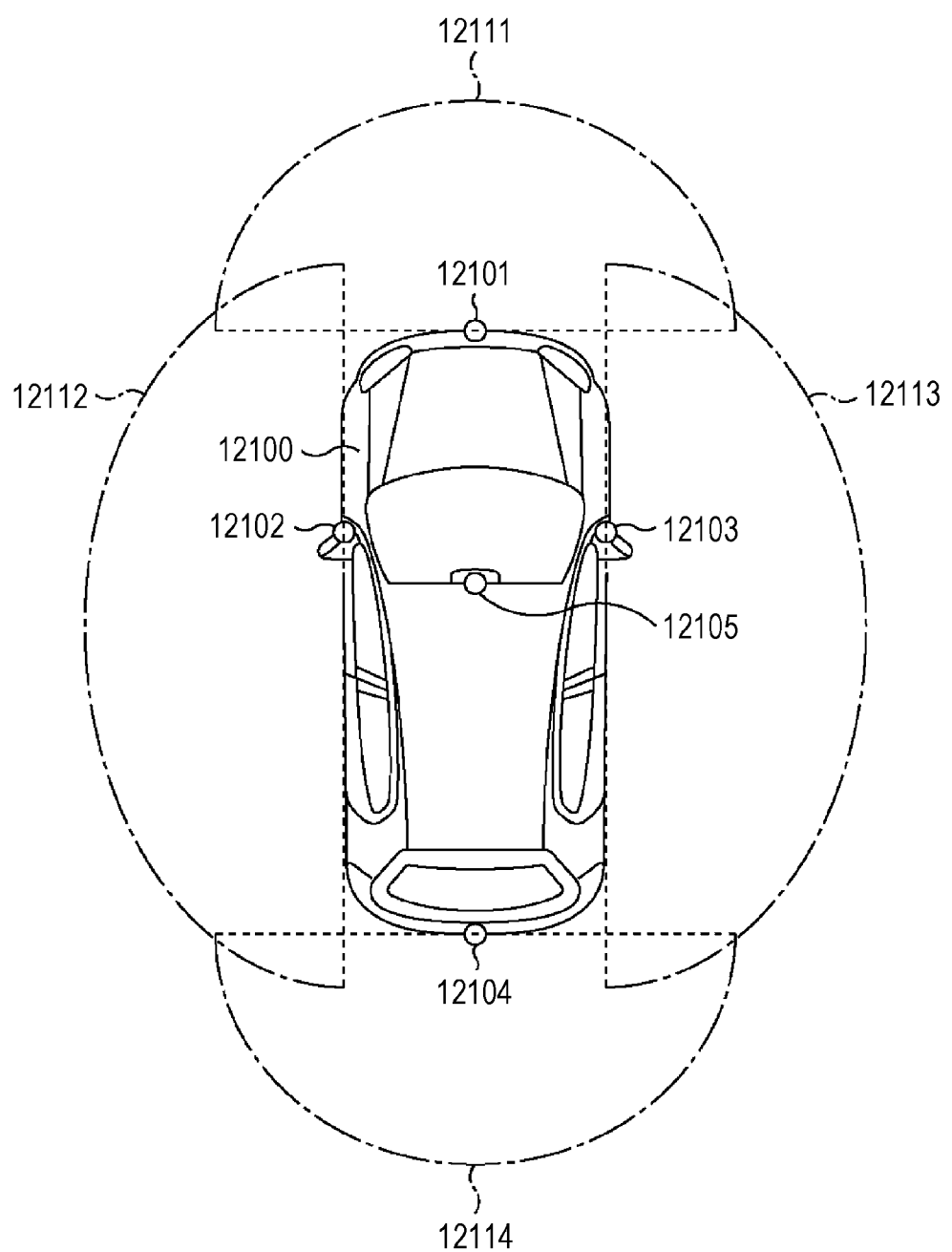
FIG. 13 is an explanatory drawing showing an example of installation positions of an outside information detector and an imaging portion.

FIG. 13 is a diagram showing an example of the installation position of the imaging portion 12031.

In FIG. 13, imaging portions 12101, 12102, 12103, 12104, and 12105 are included as the imaging portion 12031.

For example, the imaging portions 12101, 12102, 12103, 12104, and 12105 are provided in positions such as a front nose, a side mirror, a rear bumper, a back door, and an upper portion of a windshield in a vehicle compartment of the vehicle 12100. The imaging portion 12101 provided on the front nose and the imaging portion 12105 provided on the upper portion of the windshield in the vehicle compartment mainly acquire images of the front of the vehicle 12100. The imaging portions 12102 and 12103 provided on the side mirrors mainly acquire images of the side of the vehicle 12100. The imaging portion 12104 provided on the rear bumper or the back door mainly acquires an image of the rear of the vehicle 12100. The imaging portion 12105 provided on the upper portion of the windshield in the vehicle compartment is mainly used to detect a preceding vehicle or a pedestrian, an obstacle, a traffic light, a traffic sign, a lane, or the like.

Note that FIG. 13 shows an example of the imaging range of the imaging portions 12101 to 12104. An imaging range 12111 indicates the imaging range of the imaging portion 12101 provided in the front nose, imaging ranges 12112 and 12113 indicate the imaging ranges of the imaging portions 12102 and 12103 provided on the side mirrors, respectively, and an imaging range 12114 indicates the imaging range of the imaging portion 12104 provided in the rear bumper or the back door. For example, by superimposing the pieces of image data captured by the imaging portions 12101 to 12104, a bird's eye view image of the vehicle 12100 as viewed from above can be obtained.

At least one of the imaging portions 12101 to 12104 may have a function of acquiring distance information. For example, at least one of the imaging portions 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging portions 12101 to 12104, to extract, as a preceding vehicle, the closest three-dimensional object on the traveling path of the vehicle 12100 in particular, among three-dimensional objects traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging portions 12101 to 12104, the microcomputer 12051 can extract three-dimensional object data regarding three-dimensional objects by classifying the data into three-dimensional objects such as two-wheeled vehicle, ordinary vehicle, large vehicle, pedestrian, telephone pole, and other three-dimensional object, and use the data for automatic avoidance of obstacles. For example, the microcomputer 12051 identifies obstacles around the vehicle 12100 into obstacles visible and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, can perform driving support for collision avoidance by outputting a warning to the driver through the audio speaker 12061 or the display 12062, or by performing forcible deceleration or avoidance steering through the drive system control unit 12010.

At least one of the imaging portions 12101 to 12104 may be an infrared camera that detects infrared light. For example, the microcomputer 12051 can recognize a pedestrian by determining whether or not a pedestrian is present in the images captured by the imaging portions 12101 to 12104. Such pedestrian recognition is performed by a procedure of extracting feature points in images captured by the imaging portions 12101 to 12104 as infrared cameras, and a procedure of performing pattern matching processing on a series of feature points indicating the outline of an object to determine whether or not the object is a pedestrian, for example. If the microcomputer 12051 determines that a pedestrian is present in the images captured by the imaging portions 12101 to 12104 and recognizes the pedestrian, the audio image output portion 12052 controls the display 12062 to superimpose a square outline for emphasis on the recognized pedestrian. Additionally, the audio image output portion 12052 may control the display 12062 to display an icon or the like indicating a pedestrian in a desired position.

The example of the vehicle control system to which the technology according to the present disclosure can be applied has been described above. Of the configurations described above, the technology according to the present disclosure may be applied to, for example, the imaging portions 12031, 12101, 12102, 12103, 12104, and 12105, or may be applied to the outside information detection unit 12030, and the like. The imaging portions 12031, 12101, 12102, 12103, 12104, 12105, or the outside information detection unit 12030 can use the present technology to detect an image area having an unnatural image characteristics generated by color reproduction processing, and present display to the driver or the like so that the image area having the unnatural image characteristic is inconspicuous, it is possible to prevent attention from being directed to the image area with the unnatural image characteristic when confirming the situation outside the vehicle, for example. Additionally, when performing automatic drive control using captured images acquired by the imaging portions 12031, 12101, 12102, 12103, 12104, 12105, and the like, even if an image area having an unnatural image characteristic is generated by color reproduction processing, it is possible to perform drive control without being affected by the image area with the unnatural image characteristic.

The series of processing described in the specification can be executed by hardware, software, or a combined configuration of both. In the case of executing processing by software, a program in which a processing sequence is recorded is installed in a memory of a computer incorporated in dedicated hardware to be executed. Alternatively, the program can be installed and executed on a general-purpose computer capable of executing various types of processing.

For example, the program can be recorded in advance on a hard disk, a solid state drive (SSD), or a read only memory (ROM) as a recording medium. Alternatively, the program can be stored (recorded) temporarily or permanently on a removable recording medium such as a flexible disk, a compact disc read only memory (CD-ROM), a magneto optical (MO) disk, a digital versatile disc (DVD), a Blu-ray disc (BD) (registered trademark), a magnetic disk, or a semiconductor memory card. Such a removable recording medium can be provided as so-called package software.

In addition to installing the program from the removable recording medium to a computer, the program may be transferred from a download site to a computer wirelessly or by wire through a network such as a local area network (LAN) or the Internet. The computer can receive the program transferred in this way and install it on a recording medium such as a built-in hard disk.

Note that the effects described in the specification are merely examples and are not limited, and additional effects not described herein can be obtained. Additionally, the present technology should not be construed as being limited to the embodiments of the technology described above. The embodiments of the technology disclose the present technology in the form of examples, and it is obvious that those skilled in the art can make modifications and substitutions of the embodiments without departing from the gist of the present technology. In other words, the scope of claims should be considered in order to determine the gist of the present technology.

Additionally, the image processing device according to the present technology can also have the following configurations.

(1) An image processing device including
a color reproduction processing unit that performs color reproduction processing on an image signal, and
an area detection unit that detects an image area having undergone a characteristic change exceeding a predetermined change amount, by using an image signal before the color reproduction processing and an image signal after the color reproduction processing.

(2) The image processing device according to (1), in which
when a change amount of a dispersion of a pixel signal after the color reproduction processing with respect to a dispersion of the pixel signal before the color reproduction processing in a predetermined area based on a determination target pixel exceeds a threshold, the area detection unit determines that the determination target pixel is a pixel in the image area having undergone a characteristic change exceeding a predetermined change amount.

(3) The image processing device according to (2), in which
the area detection unit adjusts the threshold according to an attribute of an image based on the image signal before the color reproduction processing.

(4) The image processing device according to (3), in which
the area detection unit uses at least one of a color and texture level of a subject or brightness of the image as the attribute of the image.

(5) The image processing device according to any one of (1) to (4), in which
the area detection unit determines, as a pixel of the image area having undergone a characteristic change exceeding a predetermined change amount, a pixel in which a pixel signal before the color reproduction processing is unsaturated and the pixel signal after the color reproduction processing is saturated.

(6) The image processing device according to (1), in which
when a change amount of a dispersion of a pixel signal after the color reproduction processing with respect to a dispersion of the pixel signal before the color reproduction processing in a predetermined area based on a determination target pixel exceeds a threshold, and the pixel signal of the determination target pixel is unsaturated before the color reproduction processing and becomes saturated after the color reproduction processing, the area detection unit determines that the determination target pixel is a pixel in the image area having undergone a characteristic change exceeding a predetermined change amount.

(7) The image processing device according to any one of (1) to (6), in which
the color reproduction processing unit includes at least one of white balance adjustment, color gradation conversion processing, or color space conversion processing as the color reproduction processing.

(8) The image processing device according to any one of (1) to (7) further including a warning unit that notifies a user of occurrence of a characteristic change exceeding the predetermined change amount detected by the area detection unit.

(9) The image processing device according to (8), in which
the warning unit is capable of identifying the image area having undergone a characteristic change exceeding a predetermined change amount in a display image based on the image signal after the color reproduction processing.

(10) The image processing device according to (1) further including a sensor unit that generates spectral information, in which
the area detection unit detects whether an image area having undergone a characteristic change exceeding a predetermined change amount could occur, according to a comparison result between a light source analysis result based on the image signal and a light source analysis result based on spectral information generated by the sensor unit.

(11) The image processing device according to any one of (1) to (10) further including a blend processing unit that performs blend processing of an image signal after the color reproduction processing and an image signal not subjected to the color reproduction processing, in which
the area detection unit sets a blend ratio of blend processing performed by the blend processing unit according to a detection result of a characteristic change exceeding a predetermined change amount.

(12) The image processing device according to (11), in which
the area detection unit reduces the ratio of the image signal after the color reproduction processing with increase in the change amount of the characteristic change or increase in an area of the image area having undergone a characteristic change exceeding a predetermined change amount.

INDUSTRIAL APPLICABILITY

In the image processing device, the image processing method, the program, and the imaging device of the technology, color reproduction processing is performed on an image signal, and an image area having undergone a characteristic change exceeding a predetermined change amount is detected by using image signals before and after the color reproduction processing. Hence, since an image area of an unnatural color generated by the color reproduction processing can be detected, the technology is suitable for a video camera, an electronic device having an imaging function, and the like.

REFERENCE SIGNS LIST

10 Image processing device
11 Color reproduction processing unit
12 Area detection unit
20, 20a Imaging device
21 Imaging optical system
22 Imaging unit
30 Signal processing unit
31 Pre-processing unit
32 Demosaic processing unit
33, 33a Color reproduction processing unit
34 YC generation unit
35 Resolution converter
36 Demodulation processing unit
41 Recording unit
42 Signal output unit
43 Display unit
51 User interface (I/F) unit
53 Sensor unit
55, 55a Control unit
331 White balance adjustment unit
332 Matrix converter
333 Unit matrix converter
334 Blend processing unit
335-1 to 335-n 1st to n-th user specified color converters

The invention claimed is:

1. An image processing device comprising:
   color reproduction processing circuitry configured to perform color reproduction processing on an image signal, and
   area detection circuitry configured to detect an image area having undergone a characteristic change exceeding a predetermined change amount, by using an image signal before the color reproduction processing and an image signal after the color reproduction processing,
   wherein the area detection circuitry adjusts the predetermined change amount according to at least one of a color and texture level of a subject or brightness of an image based on the image signal before the color reproduction processing.

2. The image processing device according to claim 1, wherein
   when a change amount of a dispersion of a pixel signal after the color reproduction processing with respect to a dispersion of the pixel signal before the color reproduction processing in a predetermined area based on a determination target pixel exceeds a threshold, the area detection circuitry determines that the determination target pixel is a pixel in the image area having undergone a characteristic change exceeding a predetermined change amount.

3. The image processing device according to claim 1, wherein
   when a change amount of a dispersion of a pixel signal after the color reproduction processing with respect to a dispersion of the pixel signal before the color reproduction processing in a predetermined area based on a determination target pixel exceeds a threshold, and the pixel signal of the determination target pixel is unsaturated before the color reproduction processing and becomes saturated after the color reproduction processing, the area detection circuitry determines that the determination target pixel is a pixel in the image area having undergone a characteristic change exceeding a predetermined change amount.

4. The image processing device according to claim 1, wherein
   the color reproduction processing circuitry is configured to include at least one of white balance adjustment, color gradation conversion processing, or color space conversion processing as the color reproduction processing.

5. The image processing device according to claim 1, further comprising:
   a sensor configured to generate spectral information, wherein
   the area detection circuitry detects whether an image area having undergone a characteristic change exceeding a predetermined change amount could occur, according to a comparison result between a light source analysis result based on the image signal and a light source analysis result based on spectral information generated by the sensor.

6. An image processing device comprising:
   color reproduction processing circuitry configured to perform color reproduction processing on an image signal; and
   area detection circuitry configured to detect an image area having undergone a characteristic change exceeding a predetermined change amount, by using an image signal before the color reproduction processing and an image signal after the color reproduction processing,
   wherein the area detection circuitry is configured to determine, as a pixel of the image area having undergone a characteristic change exceeding a predetermined change amount, a pixel in which a pixel signal before the color reproduction processing is unsaturated and the pixel signal after the color reproduction processing is saturated.

7. The image processing device according to claim 6, wherein
   the color reproduction processing circuitry is configured to include at least one of white balance adjustment, color gradation conversion processing, or color space conversion processing as the color reproduction processing.

8. The image processing device according to claim 6, further comprising:
   a sensor configured to generate spectral information, wherein
   the area detection circuitry detects whether an image area having undergone a characteristic change exceeding a predetermined change amount could occur, according to a comparison result between a light source analysis result based on the image signal and a light source analysis result based on the spectral information generated by the sensor.

9. An imaging device comprising the image processing device according to claim 6.

10. An image processing device comprising:
    a color reproduction processing circuitry configured to perform color reproduction processing on an image signal;
    area detection circuitry configured to detect an image area having undergone a characteristic change exceeding a predetermined change amount, by using an image signal before the color reproduction processing and an image signal after the color reproduction processing; and
    warning circuitry configured to notify a user of occurrence of a characteristic change exceeding the predetermined change amount detected by the area detection circuitry, wherein
    the warning circuitry is configured to identify the image area having undergone a characteristic change exceeding a predetermined change amount in a display image based on the image signal after the color reproduction processing.

11. The image processing device according to claim 10, wherein
    when a change amount of a dispersion of a pixel signal after the color reproduction processing with respect to a dispersion of the pixel signal before the color reproduction processing in a predetermined area based on a determination target pixel exceeds a threshold, the area detection circuitry determines that the determination target pixel is a pixel in the image area having undergone a characteristic change exceeding a predetermined change amount.

12. The image processing device according to claim 10, wherein
    when a change amount of a dispersion of a pixel signal after the color reproduction processing with respect to a dispersion of the pixel signal before the color reproduction processing in a predetermined area based on a determination target pixel exceeds a threshold, and the pixel signal of the determination target pixel is unsaturated before the color reproduction processing and becomes saturated after the color reproduction processing, the area detection circuitry determines that the determination target pixel is a pixel in the image area having undergone a characteristic change exceeding a predetermined change amount.

13. The image processing device according to claim 10, wherein
the color reproduction processing circuitry is configured to include at least one of white balance adjustment, color gradation conversion processing, or color space conversion processing as the color reproduction processing.

14. The image processing device according to claim 10, further comprising:
a sensor configured to generate spectral information, wherein
the area detection circuitry detects whether an image area having undergone a characteristic change exceeding a predetermined change amount could occur, according to a comparison result between a light source analysis result based on the image signal and a light source analysis result based on the spectral information generated by the sensor.

15. An imaging device comprising the image processing device according to claim 10.

16. An image processing device comprising:
a color reproduction processing circuitry configured to perform color reproduction processing on an image signal;
area detection circuitry configured to detect an image area having undergone a characteristic change exceeding a predetermined change amount, by using an image signal before the color reproduction processing and an image signal after the color reproduction processing; and
blend processing circuitry configured to perform blend processing of an image signal after the color reproduction processing and an image signal not subjected to the color reproduction processing, wherein
the area detection circuitry sets a blend ratio of blend processing performed by the blend processing circuitry according to a detection result of a characteristic change exceeding a predetermined change amount.

17. The image processing device according to claim 16, wherein
the area detection circuitry reduces the ratio of the image signal after the color reproduction processing with increase in the amount of the characteristic change or increase in an area of the image area having undergone a characteristic change exceeding a predetermined change amount.

18. A non-transitory computer readable medium storing program code for image processing, the program code being executable by a processor to perform operations comprising:
color reproduction processing that performs color reproduction processing on an image signal; and
area detection processing that detects an image area having undergone a characteristic change exceeding a predetermined change amount, by using an image signal before the color reproduction processing and an image signal after the color reproduction processing,
wherein the area detection processing determines, as a pixel of the image area having undergone a characteristic change exceeding a predetermined change amount, a pixel in which a pixel signal before the color reproduction processing is unsaturated and the pixel signal after the color reproduction processing is saturated.

19. The non-transitory computer readable medium according to claim 18, wherein
the color reproduction processing includes at least one of white balance adjustment, color gradation conversion processing, or color space conversion processing as the color reproduction processing.

20. The non-transitory computer readable medium according to claim 18, wherein the operations further comprise:
generating, from a sensor, spectral information, wherein
the area detection processing detects whether an image area having undergone a characteristic change exceeding a predetermined change amount could occur, according to a comparison result between a light source analysis result based on the image signal and a light source analysis result based on the spectral information generated by the sensor.

21. A non-transitory computer readable medium storing program code for image processing, the program code being executable by a processor to perform operations comprising:
color reproduction processing that performs color reproduction processing on an image signal;
area detection processing that detects an image area having undergone a characteristic change exceeding a predetermined change amount, by using an image signal before the color reproduction processing and an image signal after the color reproduction processing; and
warning processing that notifies a user of occurrence of a characteristic change exceeding the predetermined change amount detected by the area detection processing, wherein
the warning processing identifies the image area having undergone a characteristic change exceeding a predetermined change amount in a display image based on the image signal after the color reproduction processing.

22. The non-transitory computer readable medium according to claim 21, wherein
when a change amount of a dispersion of a pixel signal after the color reproduction processing with respect to a dispersion of the pixel signal before the color reproduction processing in a predetermined area based on a determination target pixel exceeds a threshold, the area detection processing determines that the determination target pixel is a pixel in the image area having undergone a characteristic change exceeding a predetermined change amount.

23. The non-transitory computer readable medium according to claim 21, wherein
when a change amount of a dispersion of a pixel signal after the color reproduction processing with respect to a dispersion of the pixel signal before the color reproduction processing in a predetermined area based on a determination target pixel exceeds a threshold, and the pixel signal of the determination target pixel is unsaturated before the color reproduction processing and becomes saturated after the color reproduction processing, the area detection processing determines that the determination target pixel is a pixel in the image area having undergone a characteristic change exceeding a predetermined change amount.

24. The non-transitory computer readable medium according to claim 21, wherein
the color reproduction processing includes at least one of white balance adjustment, color gradation conversion processing, or color space conversion processing as the color reproduction processing.

25. The non-transitory computer readable medium according to claim 21, wherein the operations further comprise:
generating, from a sensor, spectral information, wherein the area detection processing detects whether an image area having undergone a characteristic change exceeding a predetermined change amount could occur, according to a comparison result between a light source analysis result based on the image signal and a light source analysis result based on the spectral information generated by the sensor.

\* \* \* \* \*